(12) United States Patent
Chaudhury et al.

(10) Patent No.: US 11,365,963 B2
(45) Date of Patent: Jun. 21, 2022

(54) STATE DETERMINATION APPARATUS, STATE DETERMINATION METHOD, AND COMPUTER-READABLE RECORDING MEDIUM

(71) Applicant: NEC CORPORATION, Tokyo (JP)

(72) Inventors: Subhajit Chaudhury, Tokyo (JP); Hiroshi Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 99 days.

(21) Appl. No.: 16/646,423

(22) PCT Filed: Sep. 12, 2017

(86) PCT No.: PCT/JP2017/032848
§ 371 (c)(1),
(2) Date: Mar. 11, 2020

(87) PCT Pub. No.: WO2019/053773
PCT Pub. Date: Mar. 21, 2019

(65) Prior Publication Data
US 2020/0284576 A1 Sep. 10, 2020

(51) Int. Cl.
*G06T 7/60* (2017.01)
*G01B 11/16* (2006.01)
(Continued)

(52) U.S. Cl.
CPC .......... *G01B 11/16* (2013.01); *G01B 9/02041* (2013.01); *G01B 11/161* (2013.01);
(Continued)

(58) Field of Classification Search
CPC .. G01B 11/16; G01B 9/02041; G01B 11/161; G06T 7/0004; G06T 7/001; G06T 7/60;
(Continued)

(56) References Cited

U.S. PATENT DOCUMENTS 6,012,337 A * 1/2000 Hodge ................... G01B 11/16
324/700
2006/0098861 A1 * 5/2006 See ......................... G06T 7/32
382/145
(Continued)

FOREIGN PATENT DOCUMENTS

JP 2014-109536 A 6/2014
JP 2016-084579 A 5/2016
WO 2016/152075 A1 9/2016

OTHER PUBLICATIONS

International Preliminary Report on Patentability with translation of the Written Opinion dated Mar. 17, 2020, in International Application No. PCT/JP2017/032848.
(Continued)

*Primary Examiner* — Sheela C Chawan

(57) ABSTRACT

A state determination apparatus 100 determines the state of a structure 200. The state determination apparatus 100 includes a measurement unit 10 configured to measure a deflection amount and a surface displacement amount in each of a plurality of target regions that are preset on the structure 200, a feature value calculation unit 20 configured to calculate, for the respective target regions, feature values each indicating a relationship between the deflection amount and the surface displacement amount, using the measured deflection amount and surface displacement amount, a spatial distribution calculation unit 30 configured to calculate a spatial distribution of the feature values using the feature values calculated for each of the target regions, and a degradation state determination unit 40 configured to determine a degradation state of the structure 200 based on the spatial distribution of the feature value.

15 Claims, 17 Drawing Sheets

(51) Int. Cl.
  *G01B 9/02* (2022.01)
  *G06T 7/00* (2017.01)
  *G01M 5/00* (2006.01)
(52) U.S. Cl.
  CPC ............ *G06T 7/001* (2013.01); *G06T 7/0004* (2013.01); *G06T 7/60* (2013.01); *G01M 5/0008* (2013.01); *G06T 2207/20021* (2013.01); *G06T 2207/20076* (2013.01); *G06T 2207/30132* (2013.01)
(58) Field of Classification Search
  CPC . G06T 2207/20021; G06T 2207/30132; G06T 2207/20076; G01M 5/0008; G01M 5/00; G01M 99/00
  USPC ....... 382/100, 149, 145, 144, 151, 168, 173, 382/181, 190
  See application file for complete search history.

(56) References Cited

U.S. PATENT DOCUMENTS

| | | | |
|---|---|---|---|
| 2010/0310128 A1* | 12/2010 | Iliopoulos | G01M 5/005 382/103 |
| 2017/0038307 A1* | 2/2017 | Ohta | G01B 11/16 |
| 2017/0227934 A1* | 8/2017 | Ikeda | F16K 31/02 |
| 2018/0106609 A1* | 4/2018 | Imai | G01M 5/0041 |
| 2020/0184622 A1* | 6/2020 | Chaudhury | G06T 7/0002 |

OTHER PUBLICATIONS

Li-Jun Wu, et al., "Dynamic testing of a laboratory model via vision-based sensing", Engineering Structures, 2014, pp. 113-125, vol. 60.

International Search Report for PCT/JP2017/032848 dated Nov. 21, 2017 (PCT/ISA/210).

\* cited by examiner

→ EXTRA-PLANE DISPLACEMENT: $\delta i(\delta x_i, \delta y_i)$

⟶ INTRA-PLANE DISPLACEMENT: $\Delta i(\Delta x_i, \Delta y_i)$

--→ MEASURED VECTOR: $V(V_x, V_y) = \Delta i(\Delta x_i, \Delta y_i) + \delta i(\delta x_i, \delta y_i)$

Fig.16

| STRUCTURE No. | RESULT OF INSPECTION CONDUCTED BY INSPECTOR | FIRST EXAMPLE EMBODIMENT | | SECOND EXAMPLE EMBODIMENT | | THIRD EXAMPLE EMBODIMENT | |
|---|---|---|---|---|---|---|---|
| | | $e_r$ | DETERMINATION RESULT | $H_c$ | DETERMINATION RESULT | $\sigma_k$ | DETERMINATION RESULT |
| 1 | LOW | 0.0006 | LOW | 0.39 | LOW | 0.0060 | LOW |
| 2 | LOW | 0.0008 | LOW | 0.68 | LOW | 0.0034 | LOW |
| 3 | LOW | 0.0005 | LOW | 0.63 | LOW | 0.0026 | LOW |
| 4 | LOW | 0.0004 | LOW | 0.49 | LOW | 0.0015 | LOW |
| 5 | HIGH | 0.008 | HIGH | 1.61 | HIGH | 0.033 | HIGH |
| 6 | HIGH | 0.009 | HIGH | 1.42 | HIGH | 0.082 | HIGH |
| 7 | HIGH | 0.047 | HIGH | 1.34 | HIGH | 0.42 | HIGH |
| 8 | HIGH | 0.023 | HIGH | 0.82 | HIGH | 0.89 | HIGH |

$e_r < 0.001 \rightarrow$ LOW, $e_r \geq 0.001 \rightarrow$ HIGH $H_c < 0.75 \rightarrow$ LOW, $H_c \geq 0.75 \rightarrow$ HIGH $\sigma_k < 0.01 \rightarrow$ LOW, $\sigma_k \geq 0.01 \rightarrow$ HIGH

STATE DETERMINATION APPARATUS, STATE DETERMINATION METHOD, AND COMPUTER-READABLE RECORDING MEDIUM

CROSS REFERENCE TO RELATED APPLICATIONS

This application is a National Stage of International Application No. PCT/JP2017/032848 filed Sep. 12, 2017, the disclosure of which is incorporated herein in its entirety by reference.

TECHNICAL FIELD

The present invention relates to a state determination apparatus and a state determination method for determining the degradation state of a structure, and further relates to a computer-readable recording medium that includes a program for realizing the same recorded thereon.

BACKGROUND ART

It is known that, in concrete structures such as tunnels and bridges, defects occurring on the surface of structures, such as cracking, detachment, and internal hollowing, affect the soundness of the structures. Accordingly, these defects need to be accurately detected.

Defects of a structure, such as cracking, detachment, and internal hollowing, are detected through a visual inspection or a hammering test conducted by an inspector, and the inspector needs to approach the structure to conduct the inspection. For this reason, problems arise including an increase in work costs due to preparation of an environment in which work can be carried out in midair, a loss of economic opportunities due to traffic regulations conducted to configure the work environment, and so on, and there is demand for a method with which an inspector can remotely inspect a structure.

As a method of remotely inspecting a structure, for example, a method has been proposed in which a deflection amount distribution of a bridge, which is a structure, is measured based on an image obtained by imaging the bridge using an image capture device to detect an abnormality in the structure (e.g. see Patent Document 1). In addition, a method of measuring surface distortion of a structure to measure the degree of fatigue thereof (e.g. see Patent Document 2) has also been proposed.

LIST OF RELATED ART DOCUMENTS

Patent Document

Patent Document 1: Japanese Patent Laid-Open Publication No. 2016-84579
Patent Document 2: Japanese Patent Laid-Open Publication No. 2014-109536

SUMMARY OF INVENTION

Problems to be Solved by the Invention

The method disclosed in Patent Document 1 only uses the deflection amount distribution to detect an abnormality of a structure. In the method disclosed in Patent Document 2, the degree of fatigue of a structure is measured only by measuring surface distortion. That is to say, in the methods disclosed in Patent Documents 1 and 2, only one of the deflection amount and the surface distortion of a structure is used to conduct an inspection, and therefore the accuracy of these methods is problematic.

In contrast, an inspection can be conducted using both the deflection amount and the surface distortion of a structure by combining the method disclosed in Patent Document 1 and the method disclosed in Patent Document 2, but in this case, an appropriate inspection is difficult if consideration is not given to the relationship therebetween. This is because the influence that appears as the deflection amount and the surface distortion differs depending on the state of a structure.

An example object of the invention is to solve the foregoing problems and provide a state determination apparatus, a state determination method, and a computer-readable recording medium that enable the degradation state of a structure to be properly determined using both a deflection amount and a surface distortion of the structure.

Means for Solving the Problems

To achieve the above-stated example object, a state determination apparatus according to an example aspect of the invention is an apparatus for determining a state of a structure, including:
   a measurement unit configured to measure a deflection amount and a surface displacement amount of the structure in each of a plurality of target regions that are preset on the structure;
   a feature value calculation unit configured to calculate, for the plurality of respective target regions, feature values each indicating a relationship between the deflection amount and the surface displacement amount, using the measured deflection amount and surface displacement amount;
   a spatial distribution calculation unit configured to calculate a spatial distribution of the feature values of the structure, using the feature values calculated for the plurality of respective target regions; and
   a degradation state determination unit configured to determine a degradation state of the structure based on the calculated spatial distribution of the feature values of the structure.

To achieve the above-stated example object, a state determination method according to an example aspect of the invention is a method for determining a state of a structure, including:
   (a) a step of measuring a deflection amount and a surface displacement amount of the structure in each of a plurality of target regions that are preset on the structure;
   (b) a step of calculating, for the plurality of respective target regions, feature values each indicating a relationship between the deflection amount and the surface displacement amount, using the measured deflection amount and surface displacement amount;
   (c) a step of calculating a spatial distribution of the feature values of the structure, using the feature values calculated for the plurality of respective target regions; and
   (d) a step of determining a degradation state of the structure based on the calculated spatial distribution of the feature values of the structure.

Furthermore, to achieve the above-stated example object, a computer-readable recording medium according to an example aspect of the invention is a computer-readable recording medium that includes a program recorded thereon, the program being for determining a state of a structure using a computer, the program including instructions that cause the computer to perform:
(a) a step of measuring a deflection amount and a surface displacement amount of the structure in each of a plurality of target regions that are preset on the structure;
(b) a step of calculating, for the plurality of respective target regions, feature values each indicating a relationship between the deflection amount and the surface displacement amount, using the measured deflection amount and surface displacement amount;
(c) a step of calculating a spatial distribution of the feature values of the structure, using the feature values calculated for the plurality of respective target regions; and
(d) a step of determining a degradation state of the structure based on the calculated spatial distribution of the feature values of the structure.

Advantageous Effects of the Invention

As described above, according to the invention, the degradation state of a structure can be properly determined using both a deflection amount and a surface distortion of the structure.

BRIEF DESCRIPTION OF THE DRAWINGS

FIG. 8(a) shows the case where no abnormality has occurred in any regions of interest, and FIG. 8(b) shows the case where an abnormality has occurred in any of the regions of interest.

FIG. 16 shows an example of the results of determining the degradation state in the first to third example embodiments of the invention.

EXAMPLE EMBODIMENT (First Example Embodiment)

Hereinafter, a state determination apparatus, a state determination method, and a program according to the first example embodiment of the invention will be described with reference to FIGS. 1 to 8.

[Apparatus Configuration]

Figure 1:
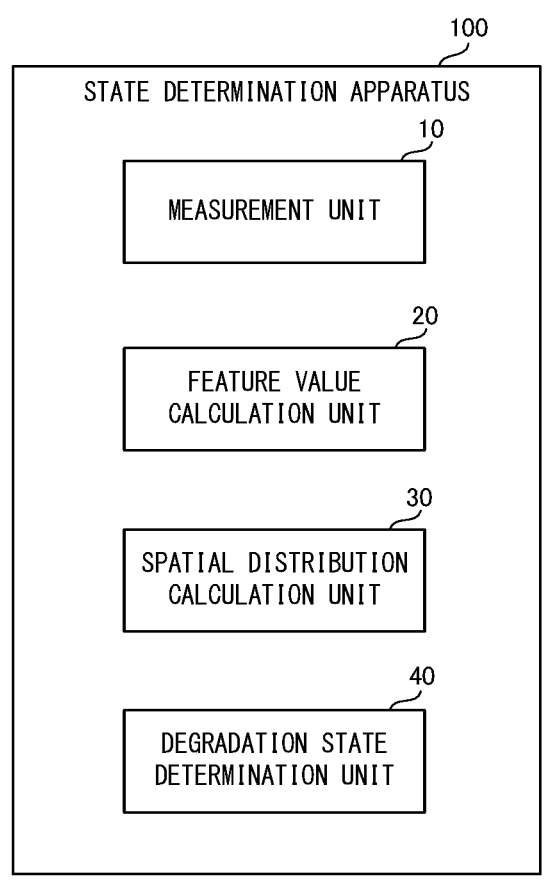
FIG. 1 is a block diagram illustrating a schematic configuration of a state determination apparatus according to a first example embodiment of the invention.

First, a schematic configuration of the state determination apparatus according to the first example embodiment will be described with reference to FIG. 1. FIG. 1 is a block diagram illustrating a schematic configuration of the state determination apparatus according to the first example embodiment of the invention.

A state determination apparatus 100 according to the first example embodiment shown in FIG. 1 is an apparatus for determining the state of a structure. As shown in FIG. 1, the state determination apparatus 100 includes a measurement unit 10, a feature value calculation unit 20, a spatial distribution calculation unit 30, and a degradation state determination unit 40.

The measurement unit 10 measures a deflection amount and a surface displacement amount of a structure in each of a plurality of target regions that are preset on the structure. The feature value calculation unit 20 calculates a feature value that indicates the relationship between a deflection amount and a surface displacement amount using the measured deflection amount and surface displacement amount, for each of the plurality of target regions.

The spatial distribution calculation unit 30 calculates a spatial distribution of feature values of the structure using the feature values calculated for the plurality of respective target regions. The degradation state determination unit 40 determines the degradation state of the structure based on the calculated spatial distribution of the feature values of the structure.

Thus, in the first example embodiment, the state determination apparatus 100 calculates feature values each indicating the relationship between a deflection amount and a surface displacement amount of a structure, and determines the degradation state of the structure using the spatial distribution obtained based on the feature values. That is to say, the state determination apparatus 100 makes a determination while giving consideration to the relationship between the deflection amount and the surface displacement amount of the structure. Therefore, according to the state determination apparatus 100, the degradation state of a structure can be properly determined using both the deflection amount and the surface distortion of the structure.

Figure 2:
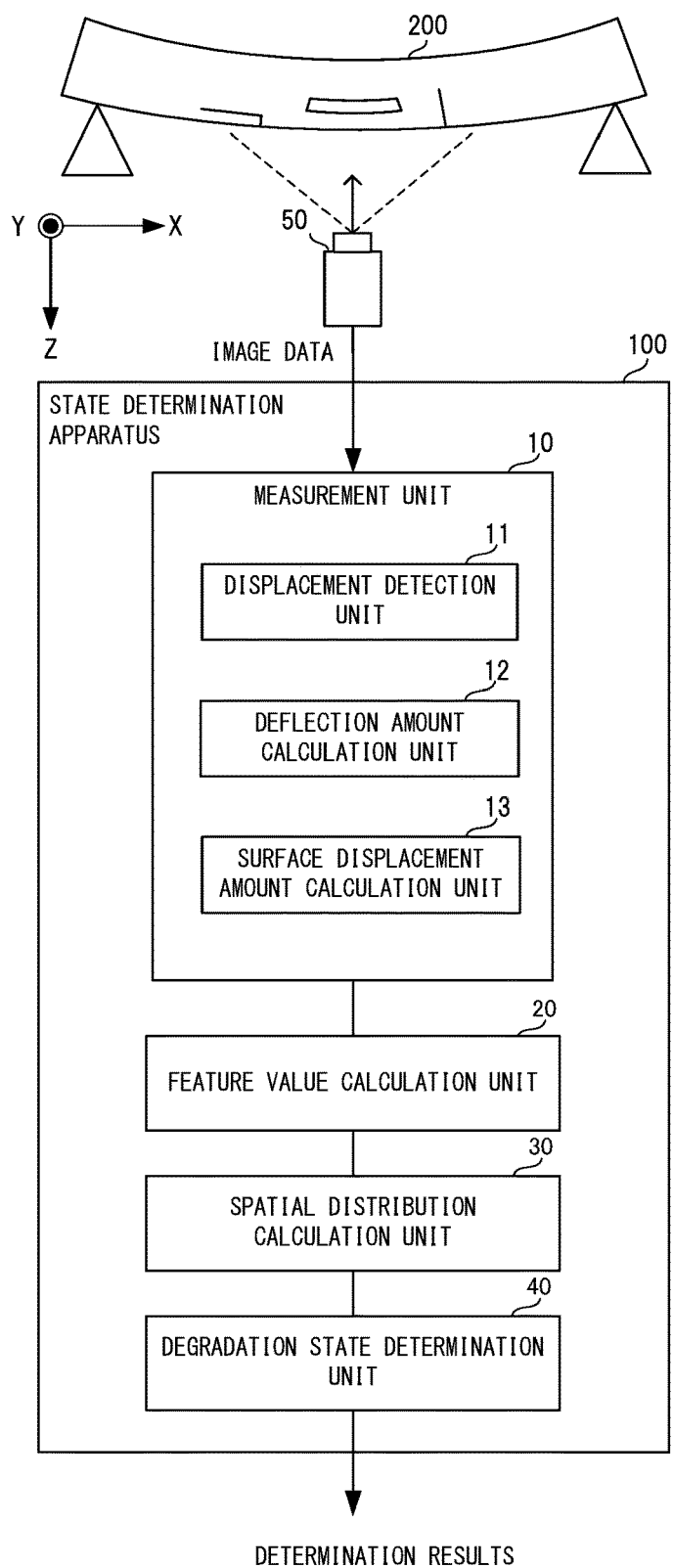
FIG. 2 is a block diagram illustrating a specific configuration of the state determination apparatus according to the first example embodiment of the invention.
Figure 3:
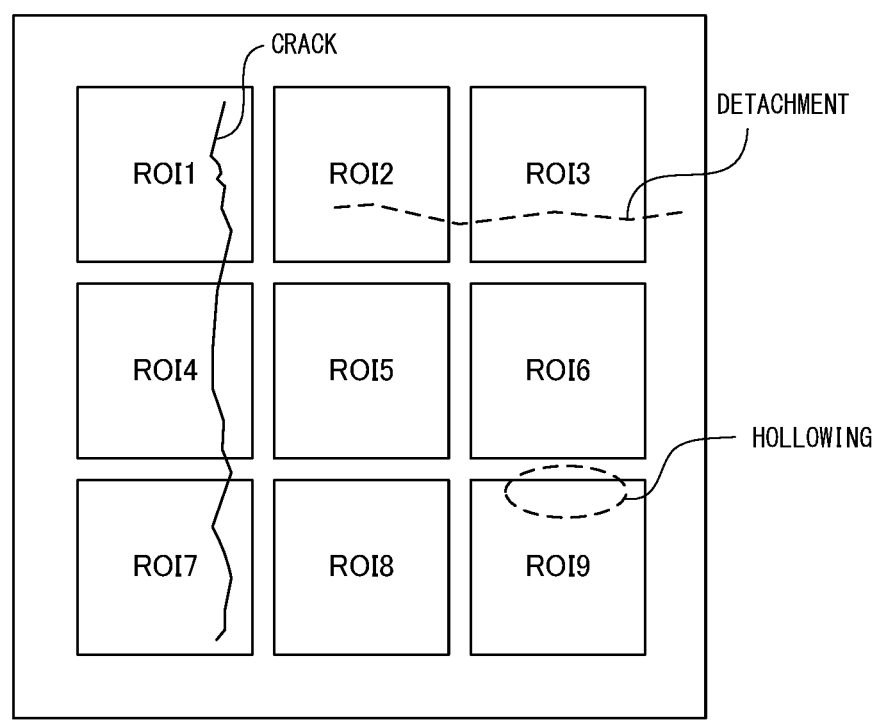
FIG. 3 shows an example of target regions that are set in the first example embodiment of the invention.
Figure 4:
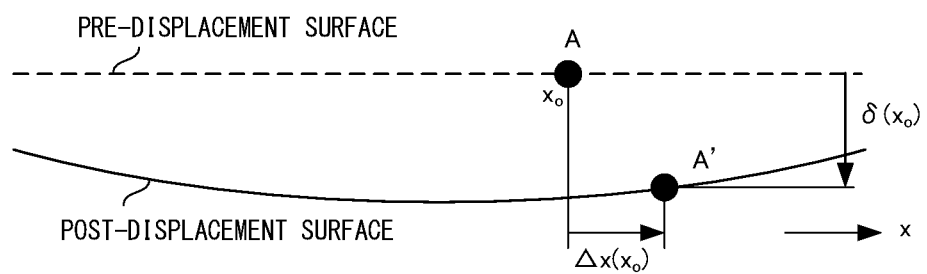
FIG. 4 illustrates a deflection amount and a surface displacement amount of a structure that are to be determined in the first example embodiment of the invention.

Next, a specific configuration of the state determination apparatus 10 according to the first example embodiment will be described with reference to FIGS. 2 to 7. FIG. 2 is a block diagram illustrating a specific configuration of the state determination apparatus according to the first example embodiment of the invention. FIG. 3 shows an example of target areas that are set in the first example embodiment of the invention. FIG. 4 illustrates a deflection amount and a surface displacement amount of a structure that are to be determined in the first example embodiment of the invention.

As shown in FIG. 2, in the first example embodiment, a target structure 200 is a bridge. In FIG. 2, the structure 200 is simplified. Also, in the first example embodiment, the state determination apparatus 100 is connected to an image capture device 50, as shown in FIG. 2.

In the first example embodiment, the image capture device 50 is arranged such that a lower surface region (slab) of the bridge is an image-capture target region, and outputs image data of a time-series image of the image-capture target region. The output image data is input to the measurement unit 10. Specifically, assuming that the longitudinal direction of the structure 200 is an x direction, the width direction is a y direction, and the vertical direction is a z direction, the image capture device 50 is arranged such that the horizontal direction of the time-series image coincides with the x direction, the vertical direction of the time-series image coincides with the y direction, and the normal of the imaging plane coincides with the vertical direction of the structure 200.

In the first example embodiment, the measurement unit 10 first sets a plurality of target regions for which determination is to be made, in image-capture target region of the structure 200, as shown in FIG. 3. The set target regions are regions to which attention is paid regarding the state determination, and are hereinafter also referred to as regions of interest (ROIs). In the example in FIG. 3, nine regions of interest ROI1 to ROI9 are set, and defects such as a crack, detachment, and hollowing are present in some of the regions of interest.

As shown in FIG. 2, the measurement unit 10 includes a displacement detection unit 11, a deflection amount calculation unit 12, and a surface displacement amount calculation unit 13. With this configuration, the measurement unit 10 measures, for each of the regions of interest, a deflection amount $\delta$ and a surface displacement amount $\Delta x$ of the structure 200 shown in FIG. 4 based on the image data output from the image capture device 50.

The displacement detection unit 11 uses an image obtained at a certain time as a reference image, and uses other images as process images. The displacement detection unit 11 obtains a displacement distribution in each of the process images, obtains a difference between the obtained displacement distribution and a displacement distribution in the reference image, and detects a displacement in the x direction and the z direction in each of the regions of interest based on the obtained difference. The deflection amount calculation unit 12 calculates, for each of the process images, the deflection amount $\delta$ in the z direction of the structure 200 in each of the regions of interest based on the detected displacement. The surface displacement amount calculation unit 12 removes, for each of the process images, a displacement deriving from a deflection of the structure from the detected displacement in each of the regions of interest, and calculates the surface displacement amount $\Delta x$ in the x direction of the structure 200.

Figure 5:
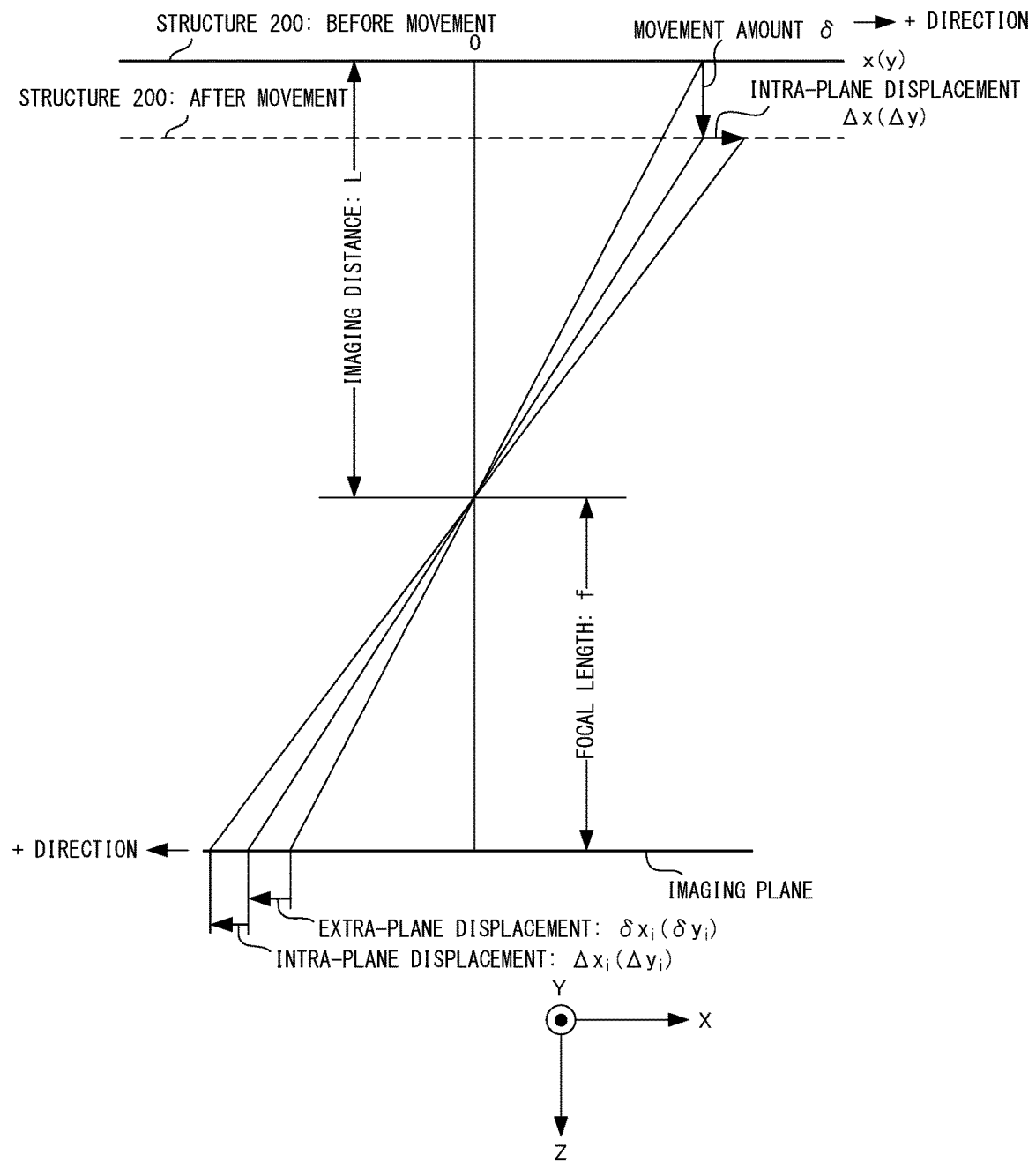
FIG. 5 shows displacements of a figure on a time-series image that occurs due to a deflection of a structure.

Here, processing performed by the measurement unit 10 will be described in detail with reference to FIGS. 5 and 6. FIG. 5 shows displacements of a figure in a time-series image that occurs due to deflection of the structure.

First, if a portion of the structure 200 (e.g. a portion of the bridge to which a load is applied) moves in the vertical direction, the image-capture target region also moves in the vertical direction, and thus, a figure in the time-series image expands or contracts in accordance with the movement. Accordingly, if the deflection amount of the structure is denoted as $\delta$, a displacement $\delta x_i$ based on the deflection amount $\delta$ occurs on the imaging plane of the image capture device 50, separately from a displacement $\Delta x_i$ that occurs due to the movement of the structure 200 in the x direction, as shown in FIG. 5. Similarly, a displacement $\delta y_i$ based on the deflection amount $\delta$ occurs on the imaging plane of the image capture device 50, separately from a displacement $\Delta y_i$ that occurs due to the movement of the structure 200 in the y direction. Also, here, the movement amount of the structure 200 in the x direction is denoted as $\Delta x$, and the movement amount of the structure 200 in the y direction is denoted as $\Delta y$.

Here, the displacements $\delta x_i$ and $\delta y_i$ based on the deflection amount $\delta$ are referred to as "extra-plane displacements", and the displacements $\Delta x_i$ and $\Delta y_i$ based on the movement of the structure 200 in the x direction and the y direction are referred to as "intra-plane displacements". If the imaging distance between the image-capture target region and the image capture device 50 is denoted as L, the focal length of the lens of the image capture device 50 is denoted as f, and the coordinates from the center of the image-capture target region is denoted as (x, y), the extra-plane displacement $\delta x_i$, the extra-plane displacement $\delta y_i$, the intra-plane displacement $\Delta x_i$, and the intra-plane displacement $\Delta y_i$ are expressed by the following Expressions 1, 2, 3, and 4.

$$\delta x_i = f\left(\frac{1}{L-\delta} - \frac{1}{L}\right)x \quad \text{[Expression 1]}$$

$$\delta y_i = f\left(\frac{1}{L-\delta} - \frac{1}{L}\right)y \quad \text{[Expression 2]}$$

$$\Delta x_i = \frac{f}{L-\delta}\Delta x \quad \text{[Expression 3]}$$

$$\Delta y_i = \frac{f}{L-\delta}\Delta y \quad \text{[Expression 4]}$$

Also, if the above Expressions 1 and 2 are collectively referred to as an extra-plane displacement vector $\delta i(\delta x_i, \delta y_i)$, this extra-plane displacement vector $\delta i(\delta x_i, \delta y_i)$ is expressed by the following Expression 5. If the above Expressions 3 and 4 are collectively referred to as an intra-plane displacement vector $\Delta i(\Delta x_i, \Delta y_i)$, this intra-plane displacement vector $\Delta i(\Delta x_i, \Delta y_i)$ is expressed by the following Expression 6.

$$\delta i(\delta x_i, \delta y_i) = \left(f\left(\frac{1}{L-\delta} - \frac{1}{L}\right)x, f\left(\frac{1}{L-\delta} - \frac{1}{L}\right)y\right) \quad \text{[Expression 5]}$$

$$\Delta i(\Delta x_i, \Delta y_i) = \left(\frac{f}{L-\delta}\Delta x, \frac{f}{L-\delta}\Delta y\right) \quad \text{[Expression 6]}$$

Figure 6:
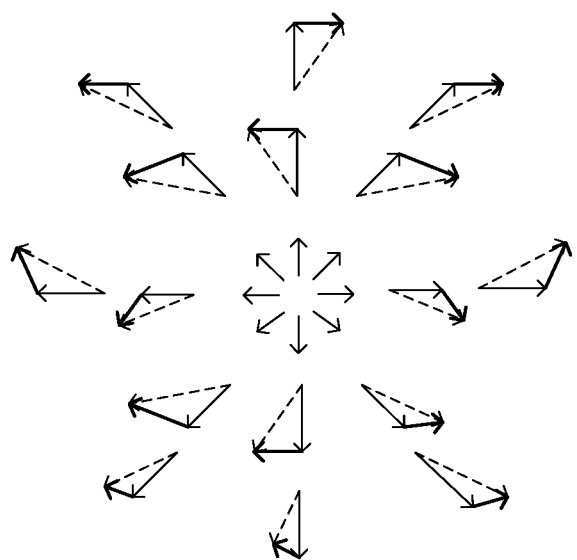
FIG. 6 shows an example of displacement vectors in a time-series image of a reference plane.

FIG. 6 shows an example of displacement vectors in a time-series image of the reference plane. Specifically, FIG. 6 shows a relationship between the extra-plane displacement vector $\delta i(\delta x_i, \delta y_i)$ and the intra-plane displacement vector Δi(Δx$_i$, Δy$_i$) that are expressed by the above Expressions 5 and 6. As shown in FIG. 6, the extra-plane displacement vector δi(δx$_i$, δy$_i$) is a radial vector group (thin solid line arrows in FIG. 6), and the magnitude R(x, y) thereof is expressed by the following Expression 7, based on the above Expressions 1 and 2. As indicated by the following Expression 7, if the deflection amount δ is constant, the magnitude thereof takes a value that is in proportion to the distance from the imaging center. Also, if the proportionality constant is denoted as k as shown in the following Expression 8, the following Expression 7 can also be expressed by Expression 9.

$$R(x, y) = \sqrt{\delta x_i(x, y)^2 + \delta y_i(x, y)^2} = f\left(\frac{1}{L-\delta} - \frac{1}{L}\right)\sqrt{x^2 + y^2} \quad \text{[Expression 7]}$$

$$k = f\left(\frac{1}{L-\delta} - \frac{1}{L}\right) \quad \text{[Expression 8]}$$

$$R(x, y) = k\sqrt{x^2 + y^2} \quad \text{[Expression 9]}$$

The displacement distribution is indicated by synthetic vectors (dotted line arrows in FIG. 6) of extra-plane displacement vectors δi(δx$_i$, δy$_i$) (thin solid line arrows in FIG. 6) and intra-plane displacement vectors Δi(Δx$_i$, Δy$_i$) (thick solid line arrows in FIG. 6). If each of these synthetic vectors is regarded as a measured vector V(V$_x$, V$_y$) and the magnitude thereof is denoted as Rmes(x, y), the measured vector V(V$_x$, V$_y$) and the magnitude Rmes(x, y) thereof can be expressed by the following Expressions 10 and 11. In the first example embodiment, the displacement detection unit 11 calculates, as a surface displacement, Rmes(x, y) expressed by the following Expression 10 and the measured vector V(V$_x$, V$_y$) expressed by the following Expression 11, for each of the regions of interest.

$$Rmes(x,y) = \sqrt{Vx(x,y)^2 + Vy(x,y)^2} \quad \text{[Expression 10]}$$

$$V(V_x, V_y) = \Delta i(\Delta x_i, \Delta y_i) + \delta i(\delta x_i, \delta y_i) \quad \text{[Expression 11]}$$

The larger the deflection amount δ, the larger the magnitude R(x, y) of the extra-plane displacement vector δi(δx$_i$, δy$_i$). The enlargement ratio of R(x, y) corresponds to a proportionality constant k given by the above Expression 8. Also, if the magnitude R(x, y) of the extra-plane displacement vector is greater than that of the intra-plane displacement vector Δi(Δx$_i$, Δy$_i$), the magnitude Rmes(x, y) of the measured vector V(V$_x$, V$_y$) varies similarly to the magnitude R(x, y) of the extra-plane displacement vector. For this reason, the expansion ratio of R(x, y) can be estimated based on Rmes(x, y). Specifically, the expansion ratio of R(x, y) can be estimated by obtaining the proportionality constant k that minimalizes an evaluation function E(k) expressed by the following Expression 12.

$$E(k) = \sum_{x,y} \{R_{mes}(x, y) - R(x, y, k)\}^2 \quad \text{[Expression 12]}$$

Accordingly, in the first example embodiment, the deflection amount calculation unit 12 applies the least squares method to the above Expression 12 and calculates an expansion coefficient k, for each of the regions of interest. Note that, in place of the sum of squares of differences between Rmes(x, y) and R(x, y) indicated by the above Expression 12, the sum of absolute values, the sum of other powers, or the like may alternatively be used as the evaluation function E(k). Furthermore, provided that the expansion ratios in an imaging region before and after movement can be obtained, the deflection amount calculation unit 12 may use any kind of algorithm.

The deflection amount calculation unit 12 then applies the calculated expansion coefficient k to the above Expression 8 and calculates the deflection amount δ, for each of the regions of interest. Also, the surface displacement amount calculation unit 12 substitutes the deflection amount δ into the above Expression 5 and calculates the extra-plane displacement vector δi(δx$_i$, δy$_i$) each of the regions of interest. Furthermore, the surface displacement amount calculation unit 12 calculates the intra-plane displacement vector Δi(Δx$_i$, Δy$_i$) for each of the regions of interest by subtracting the calculated extra-plane displacement vector δi(δx$_i$, δy$_i$) from the measured vector V(V$_x$, V$_y$) calculated by the displacement detection unit 11 (see the above Expression 11).

Thereafter, the surface displacement amount calculation unit 12 further applies the calculated intra-plane displacement vector Δi(Δx$_i$, Δy$_i$) and the deflection amount δ to the above Expression 6, and calculates the surface displacement amounts Δx and Δy of the structure, for each of the regions of interest. Note that, in the first example embodiment, the surface displacement amount calculation unit 12 only calculates the surface displacement amount Δx in the x direction.

Also, in the first example embodiment, the surface displacement amount Δx and the deflection amount δ of each of the regions of interest are obtained from each process image, i.e. from each frame when the time-series image is captured, and vary over time. For this reason, if a symbol for identifying a region of interest is r (r: natural number), the surface displacement amount in a region of interest r can be expressed as "Δx$_r$(t)", and the deflection amount in a region of interest r can be expressed as "δ$_r$(t)".

Although the deflection amount is also calculated based on the time-series image in the above example, in the first example embodiment, a distance-measuring device for measuring the distance between the structure 200 and the image capture device 50 may also be provided in addition to the image capture device 50. In this case, the measurement unit 10 measures the deflection amount based on data obtained from the distance-measuring device. Examples of distance-measuring devices may include a laser distance meter, a contact accelerometer, and a distance meter that uses a distortion sensor. The laser distance meters may be a laser interferometer, a laser distance meter that uses a light-section method, a time-of-flight laser displacement meter, or a laser Doppler velocimeter.

In the first example embodiment, the feature value calculation unit 20 first removes high-frequency components from the surface displacement amount Δx$_r$(t) and the deflection amount δ$_r$(t) calculated for each of the regions of interest in each process image, and carries out normalization. Here, if the normalized surface displacement amount is denoted as "Δx$_r^N$(t)", and the normalized deflection amount is denoted as "δ$_r^N$(t)", these are calculated using the following Expressions 13 and 14. In the following Expressions 13 and 14, μ$_x$ and σ$_x$ denote an average and a dispersion of surface displacement amounts Δx$_r$(t), respectively. Similarly, in the following Expressions 13 and 14, μ$_δ$ and σ$_δ$ denote an average and a dispersion of deflection amounts δ$_r$(t), respectively.

$$\Delta x_r^N(t) = \frac{\Delta x_r(t) - \mu_x}{\sigma_x}$$ [Expression 13]

$$\delta_r^N(t) = \frac{\delta_r(t) - \mu_\delta}{\sigma_\delta}$$ [Expression 14]

Figure 7:
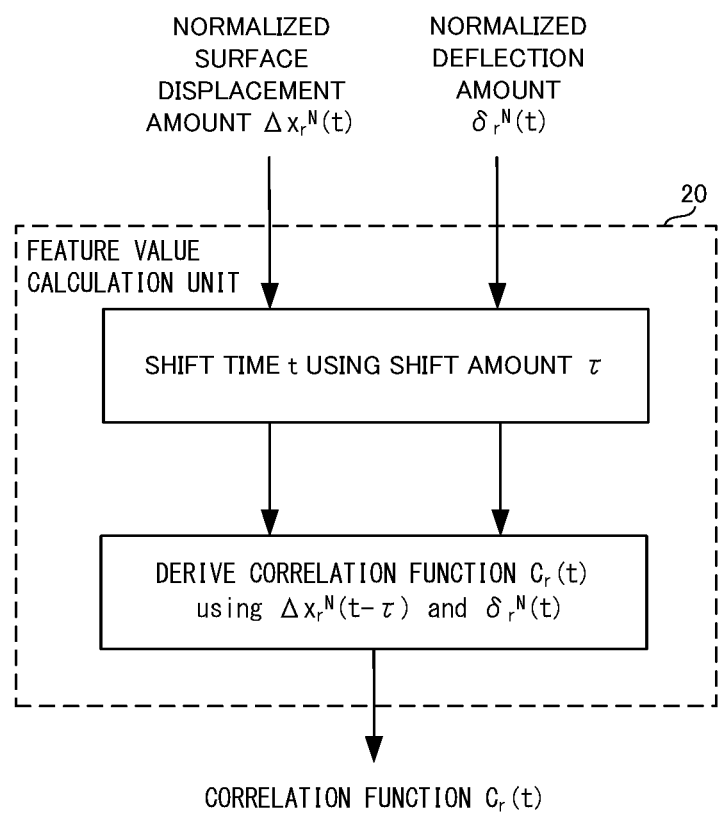
FIG. 7 illustrates processing performed by a feature value calculation unit according to the first example embodiment of the invention.

Next, as shown in FIG. 7, the feature value calculation unit 20 obtains, as a feature value, a correlation function $C_r(\xi)$ that indicates a relationship between the deflection amount and the surface displacement amount, for each of the regions of interest. FIG. 7 illustrates processing performed by the feature value calculation unit according to the first example embodiment of the invention.

Specifically, as shown in FIG. 7, the feature value calculation unit 20 first shifts time t of either one of the normalized surface displacement amount $\Delta x_r^N(t)$ and the normalized deflection amount $\delta_r^N(t)$, using a shift amount $\tau$. This is because, if the structure 200 is a bridge, the surface displacement and the deflection amount occur as a result of vehicles passing over the bridge, but there may be a temporal shift between the occurrence of the surface displacement and the deflection amount. In the example in FIG. 7, the surface displacement amount $\Delta x_r^N(t)$ at time t is shifted by a period $\tau$.

The feature value calculation unit 20 then obtains a correlation function $C_r(t)$ for each of the regions of interest by applying the normalized surface displacement amount $\Delta x_r^N(t)$ and the normalized deflection amount $\delta_r^N(t)$ that are obtained above to the following Expression 15.

$$C_r(\tau) = \sum_{t_i} \Delta x_r^N(t_i) \delta_r^N(t_i - t)$$ [Expression 15]

Figure 8A:
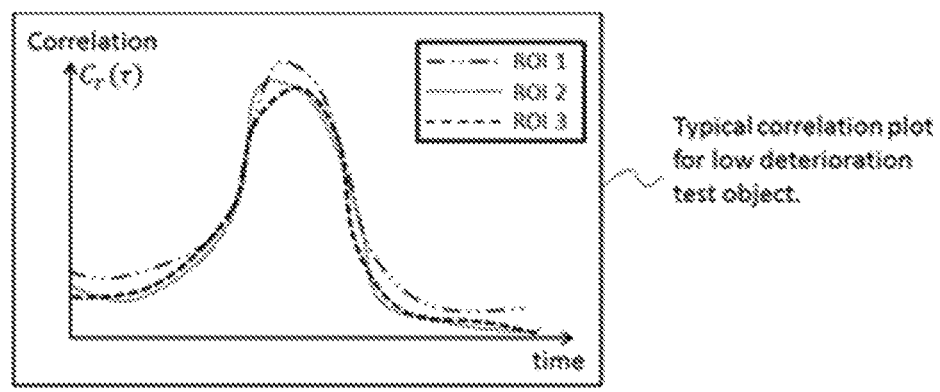
FIGS. 8(a) and 8(b) show examples of correlation functions obtained in the first example embodiment of the invention.
Figure 8B:
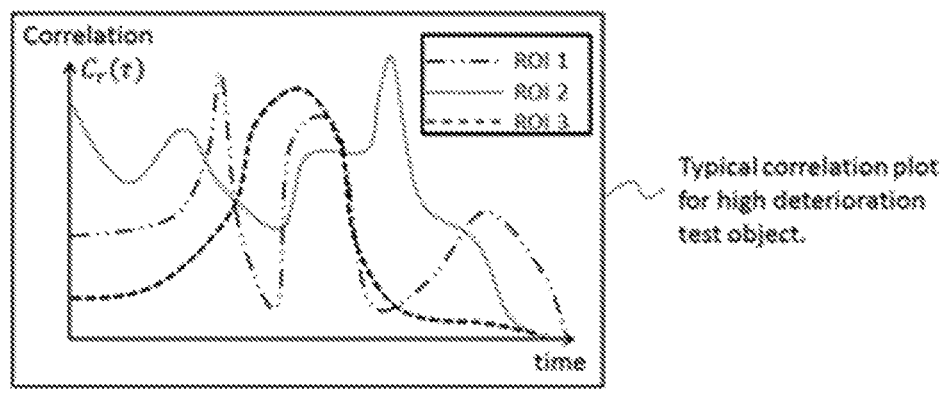

If no abnormality has occurred in any of the regions of interest, the correlation functions that are thus obtained for the respective regions of interest, when plotted into a graph, form graphs each having a peak at the position of the aforementioned temporal shift amount $\tau$, and depict similar lines, as shown in FIG. 8(a). On the other hand, if an abnormality has occurred in any of the regions of interest, the correlation functions, when plotted into graphs, depict different lines as shown in FIG. 8(b).

In the first example embodiment, the spatial distribution calculation unit 30 calculates a spatial distribution of feature values of the structure 200, e.g. a dispersion of a distribution function obtained based on a correlation function group in the target regions (a set of the correlation functions $C_r(t)$ for the regions of interest), using the correlation functions $C_r(t)$ obtained for the plurality of respective regions of interest.

Figure 9:
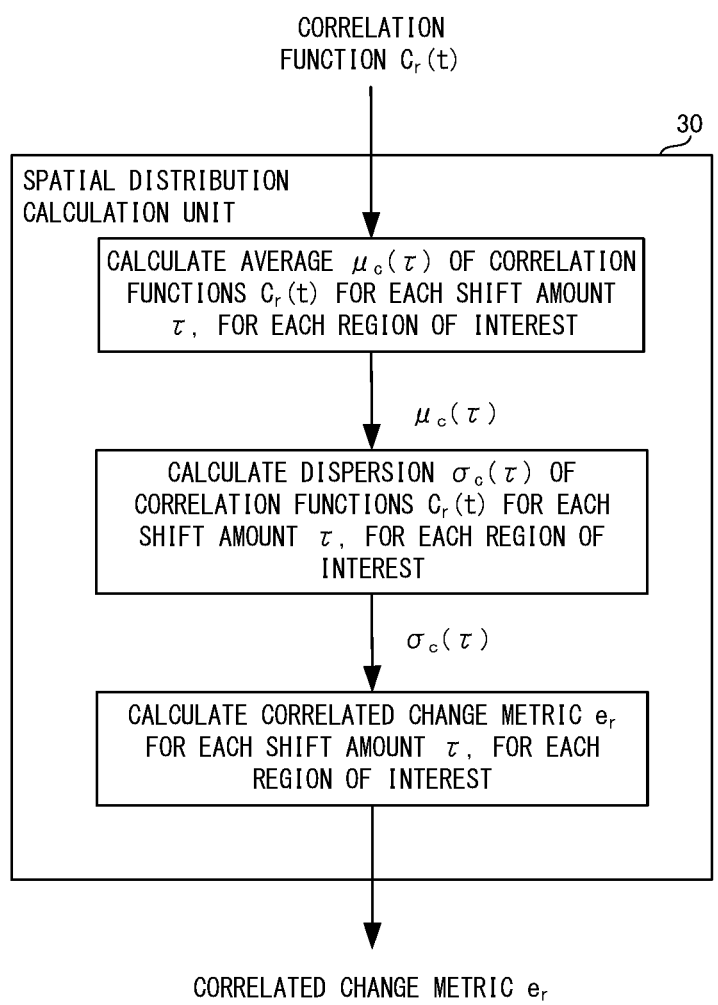
FIG. 9 illustrates processing performed by a spatial distribution calculation unit according to the first example embodiment of the invention.

Processing performed by the spatial distribution calculation unit 30 will now be described in detail with reference to FIG. 9. As shown in FIG. 9, the spatial distribution calculation unit 30 first sets N specific values of the shift amount $\tau$. The spatial distribution calculation unit 30 then calculates an average $\mu_c(\tau)$ of the correlation function $C_r(t)$ for each of the set shift amounts $\tau$, for each of the regions of interest, using the following Expression 16.

$$\mu_c(\tau) = \frac{1}{N} \sum_r C_r(\tau)$$ [Expression 16]

Next, the spatial distribution calculation unit 30 substitutes the calculated average $\mu_c(T)$ into the following Expression 17, and calculates a dispersion $\sigma_c(\tau)$ of the correlation function $C_r(t)$ for each of the set shift amounts $\tau$, for each of the regions of interest.

$$\sigma_c^2(\tau) = \frac{1}{N} \sum_r (C_r(\tau) - \mu_c(\tau))^2$$ [Expression 17]

Thereafter, the spatial distribution calculation unit 30 substitutes the calculated dispersion $\sigma_c(\tau)$ into the following Expression 18, and calculates a correlated change metric $e_r$ for each of the set shift amounts $\tau$, for each of the regions of interest. The calculated correlated change metric $e_r$ corresponds to a dispersion of the distribution function.

$$e_r = \frac{1}{N} \sum_\tau \sigma_c(\tau)$$ [Expression 18]

In the first example embodiment, the degradation state determination unit 40 determines the degradation state of the structure 200 based on the dispersion of the distribution function, i.e. the correlated change metric $e_r$. For example, if the value of the correlated change metric $e_r$ is greater than or equal to a threshold, the degradation state determination unit 40 determines that the degradation level of the structure 200 is "high", and if the value of the correlated change metric $e_r$ is smaller than the threshold, the degradation state determination unit 40 determines that the degradation level of the structure 200 is "low". Note that the degradation level is not limited to being one of two levels that are "high" and "low", and the value of the correlated change metric $e_r$ may be used to indicate a continuous degradation level.

[Apparatus Operation]

Next, operations of the state determination apparatus 100 according to the first example embodiment will be described with reference to FIG. 10. The following description will reference FIGS. 1 to 9 as appropriate. Also, in the first example embodiment, a state determination method is carried out by operating the state determination apparatus 100. Accordingly, the following description of the operations of the state determination apparatus 100 replaces the description of the state determination method according to the first example embodiment.

Figure 10:
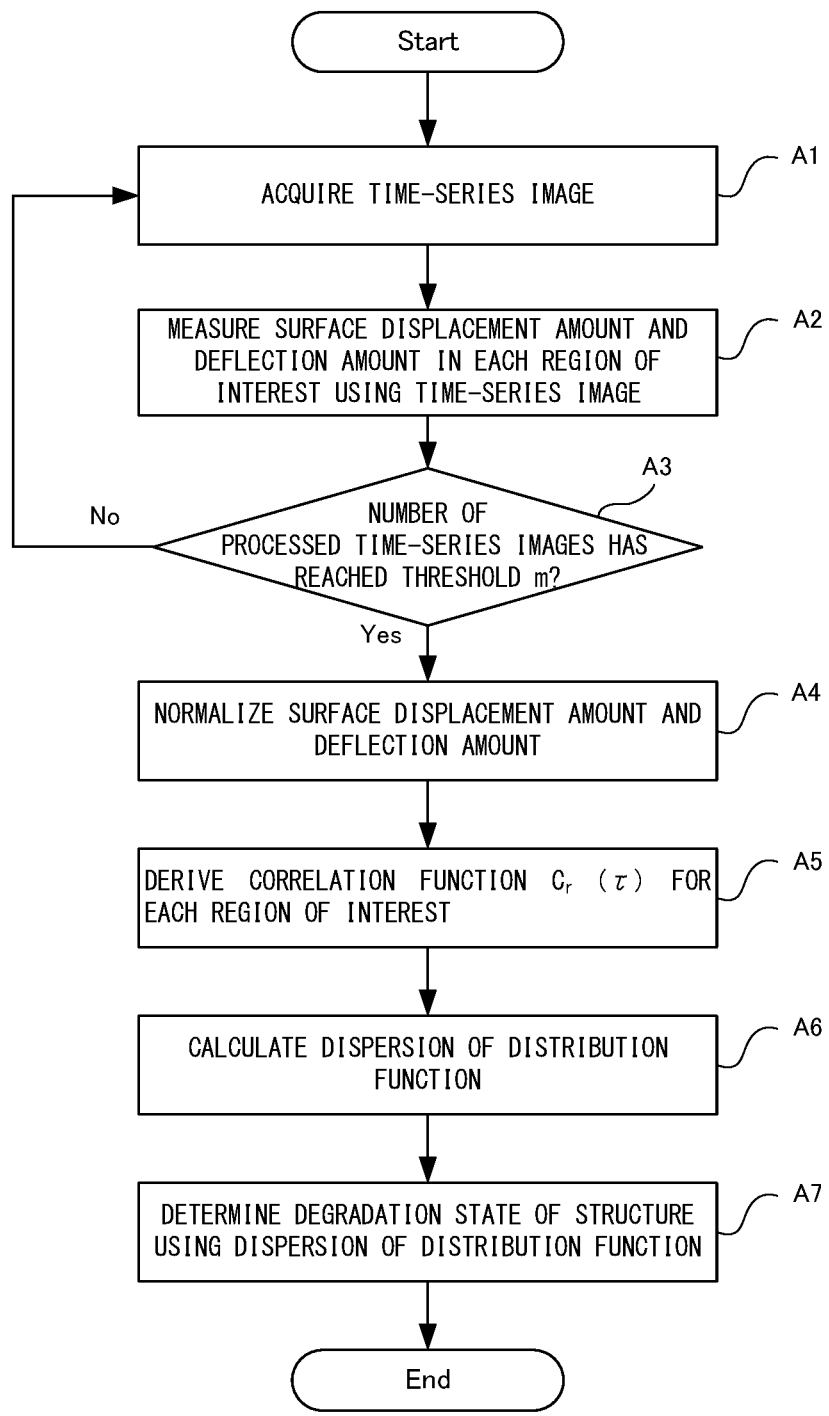
FIG. 10 is a flowchart showing operations of the state determination apparatus according to the first example embodiment of the invention.

As shown in FIG. 10, first, the measurement unit 10 acquires image data of a time-series image from the image capture device 50 (step A1). It is assumed that image data of the time-series image serving as a reference image has already been acquired, and the regions of interest have also been set.

Next, the measurement unit 10 calculates a deflection amount and a surface displacement amount of the structure 200 for each of the regions of interest, using the image data acquired in step A1 and the image data of the reference image (step A2).

Specifically, in step A2, the displacement detection unit 11 included in the measurement unit 10 first obtains displacement distributions of a process image and the reference image, and detects displacements in the x direction and the z direction for each of the regions of interest, based on a difference between the obtained two displacement distributions. The deflection amount calculation unit 12 calculates a deflection amount $\delta$ in the z direction of the structure 200 based on the detected displacement, for each of the regions of interest. The surface displacement amount calculation unit 12 removes a displacement deriving from a deflection of the structure from the detected displacement, and calculates a surface displacement amount Δx in the x direction of the structure 200, for each of the regions of interest.

Next, the measurement unit 10 determines whether or not the number of process images on which the processing in step A2 was performed has reached a threshold m (step A3). If, as a result of the determination in step A3, the number of process images has not reached the threshold m, the measurement unit 10 performs step A1 again to acquire a new process image, and performs step A2 again.

On the other hand, if, as a result of the determination in step A3, the number of process images has reached the threshold m, the measurement unit 10 delivers, to the feature value calculation unit 20, the measured deflection amount $\delta_r(t)$ and surface displacement amount $\Delta x_r(t)$ of each of the regions of interest. Thus, the feature value calculation unit 20 removes high-frequency components from the surface displacement amount $\Delta x_r(t)$ and the deflection amount $\delta_r(t)$, and performs normalization (step A4).

Next, the feature value calculation unit 20 derives, as a feature value, a correlation function $C_r(\tau)$ that indicates a relationship between the deflection amount and the surface displacement amount for each of the regions of interest, as shown in FIG. 7 (step A5). The feature value calculation unit 20 also delivers the derived correlation function $C_r(\tau)$ to the spatial distribution calculation unit 30.

Next, in the first example embodiment, the spatial distribution calculation unit 30 calculates a spatial distribution of the features values of the structure 200, or more specifically, a dispersion of a distribution function obtained based on the correlation function group, using the correlation functions $C_r(t)$ obtained for the plurality of respective regions of interest (step A6).

Next, the degradation state determination unit 40 determines the degradation state of the structure 200 based on the dispersion of the distribution function calculated in step A6 (step A7). The degradation state determination unit 40 also outputs the determination result to an external terminal device or the like.

[Effects of First Example Embodiment]

As described above, according to the first example embodiment, the state determination apparatus 100 obtains correlation functions each indicating a relationship between a deflection amount and a surface displacement amount of a structure, and determines the degradation state of the structure 200 based on a dispersion of a distribution function obtained based on the correlation functions. That is to say, the higher the correlation value of the deflection amount and the surface displacement amount, and the smaller the dispersion of the correlation values of the regions of interest, the lower the degradation level (i.e. the soundness is higher). For this reason, the first example embodiment clarifies the criteria for determining the degradation state, and can also cope with a change in the material of the structure 200. According to the first example embodiment, the degradation state of a structure can be properly determined, and robustness of the determination can also be enhanced.

[Program]

A program according to the first example embodiment need only be a program for causing a computer to perform steps A1 to A7 shown in FIG. 10. The state determination apparatus 100 and the state determination method according to the first example embodiment can be realized by installing this program on a computer and executing the program. In this case, a CPU (Central Processing Unit) of the computer functions as the measurement unit 10, the feature value calculation unit 20, the spatial distribution calculation unit 30, and the degradation state determination unit 40, and performs processing.

The program according to the first example embodiment may also be executed by a computer system that includes a plurality of computers. In this case, for example, each of the computers may function as any of the measurement unit 10, the feature value calculation unit 20, the spatial distribution calculation unit 30, and the degradation state determination unit 40.

(Second Example Embodiment)

Next, a state determination apparatus, a state determination method, and a program according to the second example embodiment of the invention will be described with reference to FIGS. 11 to 13.

First, the state determination apparatus according to the second example embodiment has the same configuration as that of the state determination apparatus 100 according to the first example embodiment shown in FIGS. 1 and 2. That is to say, the state determination apparatus according to the second example embodiment also includes a measurement unit, a feature value calculation unit, a spatial distribution calculation unit, and a degradation state determination unit. Thus, the following description will reference FIGS. 1 and 2. Also, in the following description, the functional blocks included in the state determination apparatus will be assigned the reference numerals used in the first example embodiment.

In the second example embodiment, however, the state determination apparatus differs from the state determination apparatus 100 according to the first example embodiment in terms of the functionalities of the spatial distribution calculation unit 30. The following description will focus on the differences.

In the second example embodiment, the spatial distribution calculation unit 30 calculates an entropy distribution of a distribution function obtained based on a correlation function group of the target regions, as a spatial distribution of feature values of the structure 200, using the correlation functions $C_r(t)$ obtained for the plurality of respective regions of interest.

Processing performed by the spatial distribution calculation unit 30 will now be described in detail with reference to FIGS. 11 and 12. FIG. 11 illustrates processing performed by the spatial distribution calculation unit according to the second example embodiment of the invention. FIG. 12 shows a concept of the processing shown in FIG. 11.

Figure 11:
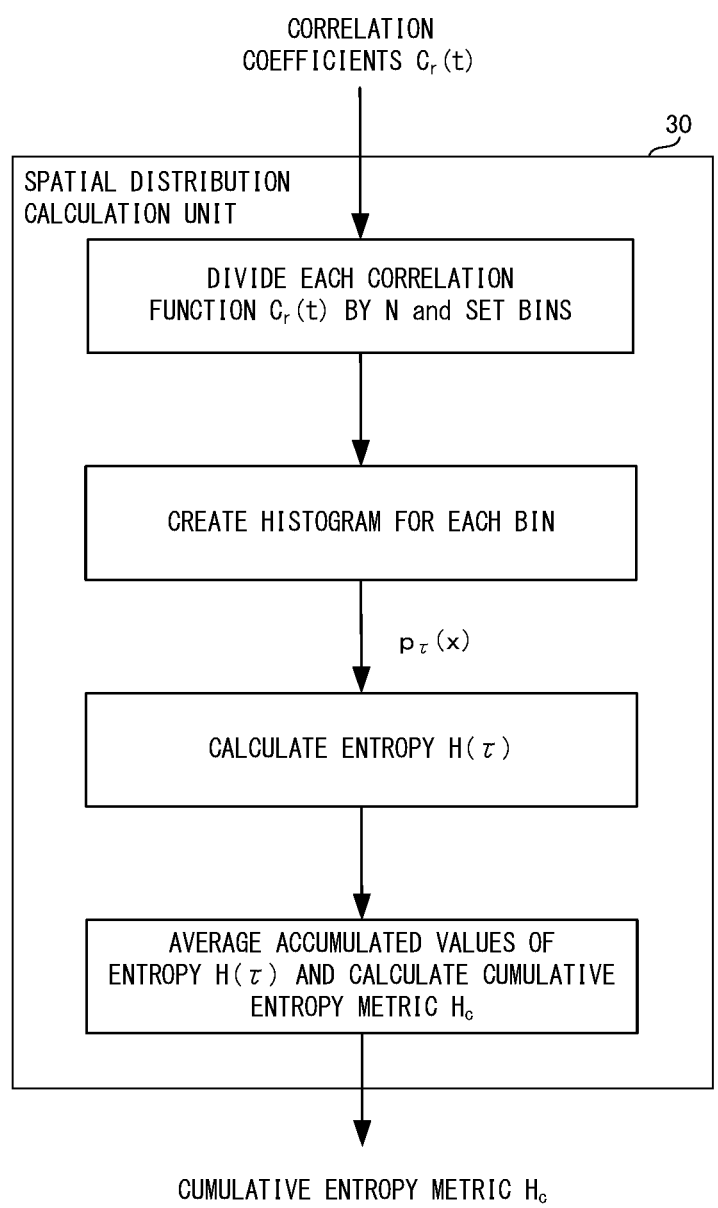
FIG. 11 illustrates processing performed by the spatial distribution calculation unit according to a second example embodiment of the invention.
Figure 12:
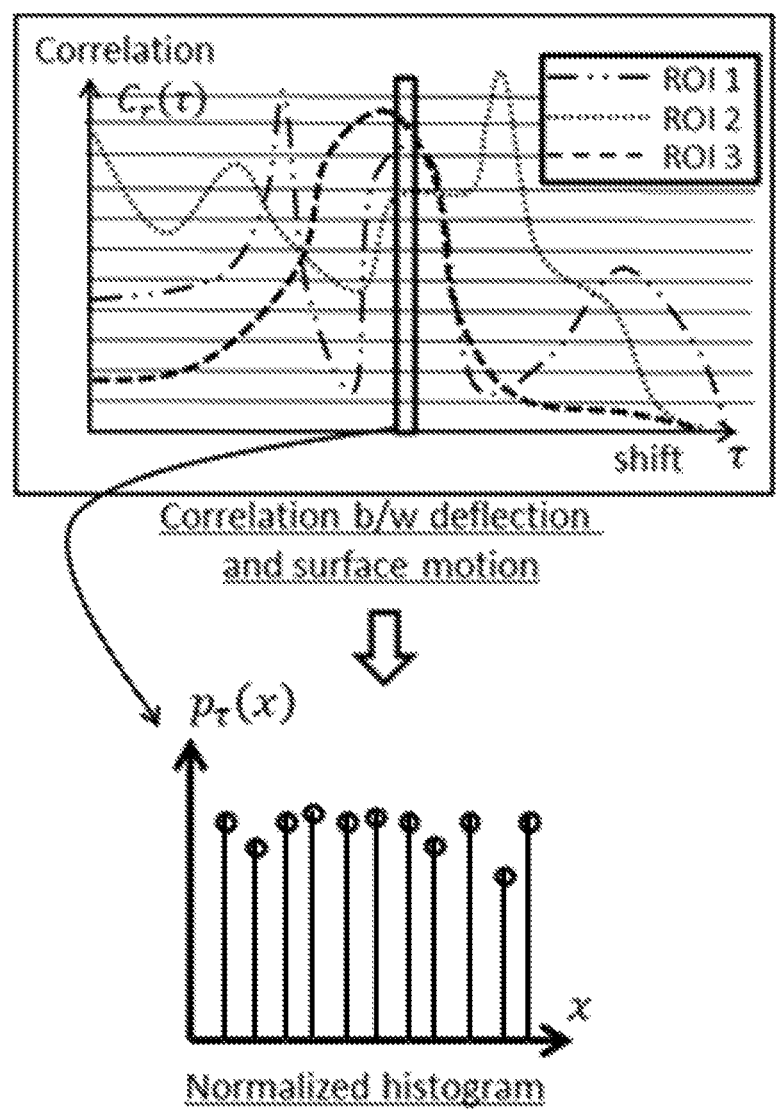
FIG. 12 shows a concept of the processing shown in FIG. 11.

As shown in FIG. 11, the spatial distribution calculation unit 30 divides each of the correlation functions $C_r(t)$ of the respective regions of interest by the number N of set shift amounts τ, and sets a plurality of bins (upper part of FIG. 12). Next, the spatial distribution calculation unit 30 creates a histogram for each of the bins, with a vertical axis indicating a frequency $p_\tau(x)$ and a horizontal axis indicating a value x of a correlation function (lower part of FIG. 12).

Next, the spatial distribution calculation unit 30 applies the frequency $p_\tau(x)$ obtained based on the histogram to Expression 19, and calculates entropy H(τ).

$$H(\tau) = -\sum_x p_\tau(x) \log(p_\tau(x))$$ [Expression 19]

Thereafter, the spatial distribution calculation unit 30 averages accumulated values of the obtained H(τ) and thus calculates a cumulative entropy metric $H_c$, using the following Expression 20. The calculated cumulative entropy metric $H_c$ corresponds to an entropy distribution of the distribution function.

$$\text{Metric } H_c = -\frac{1}{N}\sum_\tau H(\tau) \quad \text{[Expression 20]}$$

In the second example embodiment, the degradation state determination unit 40 determines the degradation state of the structure 200 based on the entropy distribution of the distribution function, i.e. the cumulative entropy metric $H_c$. For example, if the value of the cumulative entropy metric $H_c$ is greater than or equal to a threshold, the degradation state determination unit 40 determines that the degradation level of the structure 200 is "high", and if the value of the cumulative entropy metric $H_c$ is smaller than the threshold, the degradation state determination unit 40 determines that the degradation level of the structure 200 is "low". Note that the degradation level is not limited to being one of two levels that are "high" and "low", and the value of the cumulative entropy metric $H_c$ may be used to indicate a continuous degradation level.

Next, operations of the state determination apparatus according to the second example embodiment will be described with reference to FIG. 13. FIG. 13 is a flowchart showing operations of the state determination apparatus according to the second example embodiment of the invention. The following description will reference FIGS. 1, 2, 11, and 12 as appropriate. In the second example embodiment as well, the state determination method is carried out by operating the state determination apparatus. Accordingly, the following description of the operations of the state determination apparatus also replaces the description of the state determination method according to the second example embodiment.

Figure 13:
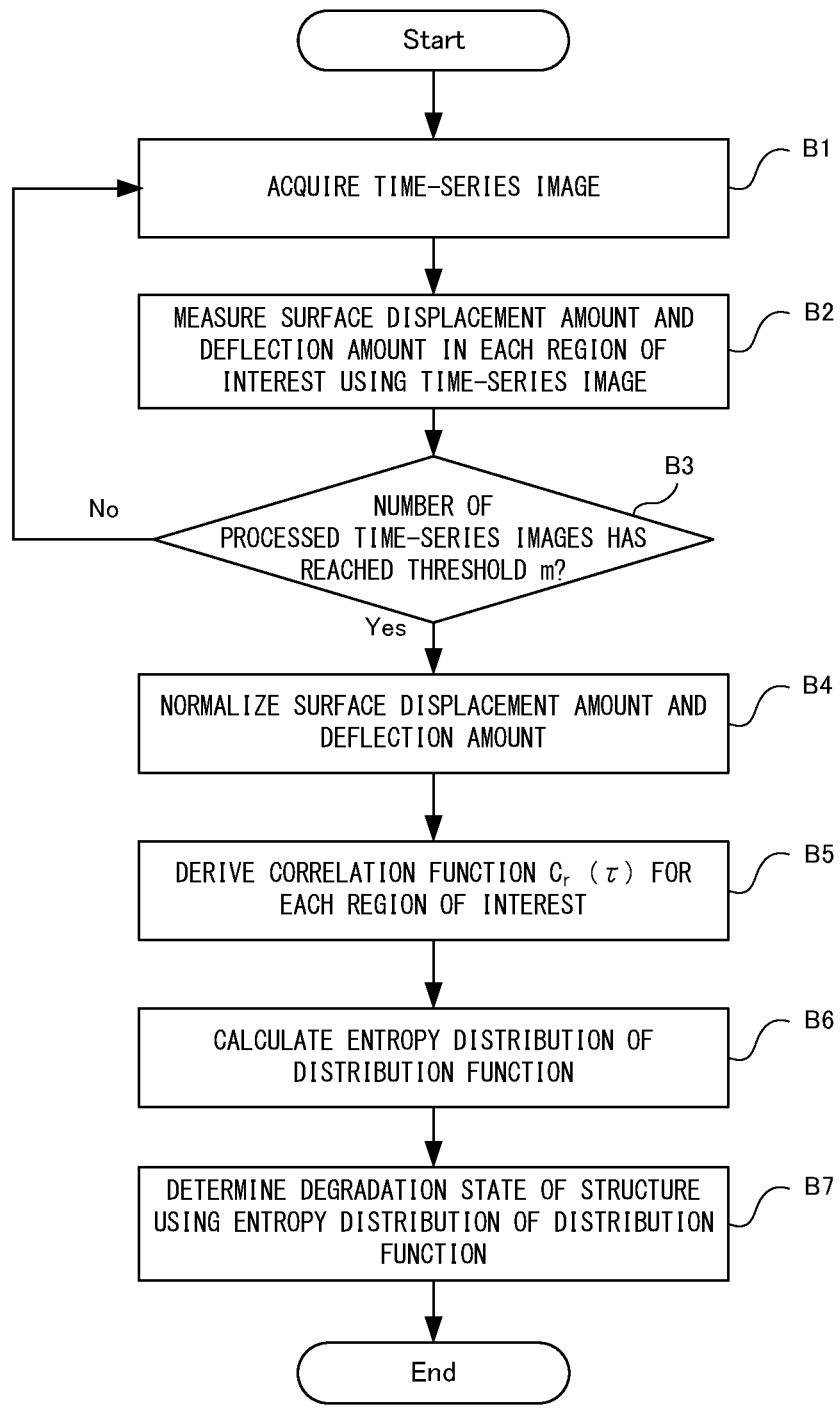
FIG. 13 is a flowchart showing operations of the state determination apparatus according to the second example embodiment of the invention.

As shown in FIG. 13, first, the measurement unit 10 acquires image data of a time-series image from the image capture device 50 (step B1). Step B1 is the same step as step A1 shown in FIG. 10.

Next, the measurement unit 10 calculates a deflection amount and a surface displacement amount of the structure 200 for each of the regions of interest, using the image data acquired in step B1 and the already-acquired image data of the reference image (step B2). Step B2 is the same step as step A2 shown in FIG. 10.

Next, the measurement unit 10 determines whether or not the number of process images that underwent the processing in step B2 has reached a threshold m (step B3). Step B3 is the same step as step A3 shown in FIG. 10. If, as a result of the determination in step B3, the number of process images has not reached the threshold m, the measurement unit 10 performs step B1 again to acquire a new process image, and also performs step B2.

On the other hand, if, as a result of the determination in step B3, the number of process images has reached the threshold m, the measurement unit 10 delivers, to the feature value calculation unit 20, the measured deflection amount $δ_r(t)$ and surface displacement amount $Δx_r(t)$ of each of the regions of interest. Thus, the feature value calculation unit 20 removes high-frequency components from the surface displacement amount $Δx_r(t)$ and the deflection amount $δ_r(t)$, and performs normalization (step B4). Step B4 is the same step as step A4 shown in FIG. 10.

Next, the feature value calculation unit 20 derives, as a feature value, a correlation function $C_r(τ)$ that indicates a relationship between the deflection amount and the surface displacement amount, for each of the regions of interest, as shown in FIG. 11 (step B5). Step B5 is the same step as step A5 shown in FIG. 10.

Next, the spatial distribution calculation unit 30 calculates an entropy distribution of a distribution function obtained based on the correlation function group, using the correlation functions $C_r(t)$ obtained for the plurality of respective regions of interest (step B6).

Next, the degradation state determination unit 40 determines the degradation state of the structure 200, based on the entropy distribution of the distribution function calculated in step B6 (step B7). The degradation state determination unit 40 also outputs the determination result to an external terminal device or the like.

[Effects of Second Example Embodiment]

As described above, in the second example embodiment, the state determination apparatus determines the degradation state of a structure based on an entropy distribution of a distribution function obtained based on correlation functions each indicating a relationship between a deflection amount and a surface displacement amount of the structure. That is to say, the higher the correlation value of the deflection amount and the surface displacement amount, and the smaller the entropy distribution of the correlation values for the respective regions of interest, the lower degradation level (i.e. the soundness is higher). For this reason, the second example embodiment also clarifies the criteria for determining the degradation state, and can also cope with a change in the material of the structure, similarly to the first example embodiment. The second example embodiment can also make it possible to properly determine the degradation state of a structure, and can also enhance robustness of the determination.

[Program]

A program according to the second example embodiment need only be a program for causing a computer to perform steps B1 to B7 shown in FIG. 13. The state determination apparatus and the state determination method according to the second example embodiment can be realized by installing this program on a computer and executing the program. In this case, a CPU (Central Processing Unit) of the computer functions as the measurement unit 10, the feature value calculation unit 20, the spatial distribution calculation unit 30, and the degradation state determination unit 40, and performs processing.

The program according to the second example embodiment may also be executed by a computer system that includes by a plurality of computers. In this case, for example, each of the computers may function as any of the measurement unit 10, the feature value calculation unit 20, the spatial distribution calculation unit 30, and the degradation state determination unit 40.

(Third Example Embodiment)

Figure 14:
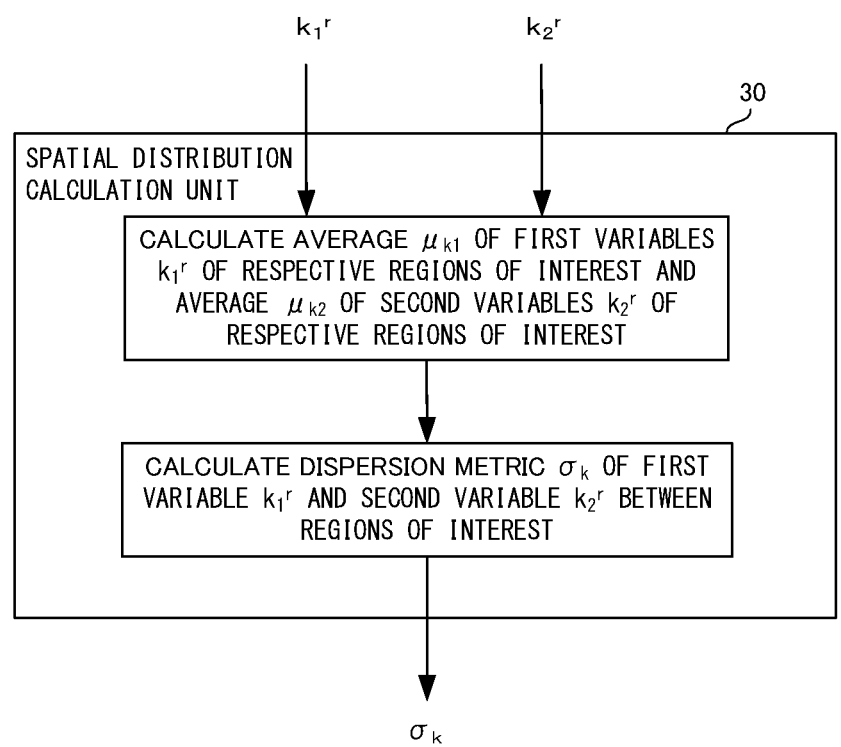
FIG. 14 illustrates processing performed by the spatial distribution calculation unit according to a third example embodiment of the invention.

Next, a state determination apparatus, a state determination method, and a program according to the third example embodiment of the invention will be described with reference to FIGS. 14 and 15.

First, the state determination apparatus according to the third example embodiment has the same configuration as that of the state determination apparatus 100 according to the first example embodiment shown in FIGS. 1 and 2. That is to say, the state determination apparatus according to the third example embodiment also includes a measurement unit, a feature value calculation unit, a spatial distribution calculation unit, and a degradation state determination unit.

Thus, the following description will reference FIGS. 1 and 2. Also, in the following description, the functional blocks included in the state determination apparatus are assigned the reference numerals used in the first example embodiment.

However, in the third example embodiment, the state determination apparatus differs from the state determination apparatus 100 according to the first example embodiment in terms of the functions of the feature value calculation unit 20 and the spatial distribution calculation unit 30. The following description will focus on the differences.

In the third example embodiment, the feature value calculation unit 20 uses a function that defines a relationship between a deflection amount, a surface displacement amount, and a time derivative of the deflection amount using a first variable $k_1^r$ and a second variable $k_2^r$. Here, the deflection amount is denoted as δ(t), the surface displacement amount is denoted as x(t), and the time derivative of the deflection amount is denoted as dδ(t)/dt. A surface displacement and a deflection occur in close relation to each other, as shown in FIG. 4. Since the surface displacement and the deflection amount, and the surface displacement and the time derivative of the deflection amount have components that are in a proportional relationship, a relational expression thereof is as expressed by the following Expression 21. In the following Expression 21, the first variable is denoted as k1, and the second variable is denoted as k2. The first variable k1 and the second variable k2 indicate contributions of a surface displacement that occurs due to a deflection, and of a surface displacement that occurs due to the time derivative of the deflection amount.

$$\Delta x(t) = K_1 \frac{d\delta(t)}{dt} + K_2 \delta(t) \qquad \text{[Expression 21]}$$

The feature value calculation unit 20 then calculates the first variable $k_1^r$ and the second variable $k_2^r$ for each of the regions of interest as feature values each of which indicates a relationship between the deflection amount and the surface displacement amount of the structure 200, using a function expressed by the above Expression 21.

Specifically, the feature value calculation unit 20 calculates the first variable $k_1^r$ and the second variable $k_2^r$ for each of the regions of interest, by solving a least-squares problem using the following Expression 22, which is obtained from the above Expression 21.

$$K_1^r, K_2^r = \mathrm{argmin}_{K_1, K_2} \sum_i \left( \Delta x(t_i) - K_1 \frac{d\delta}{dt}(t_i) - K_2 \delta(t_i) \right)^2 \qquad \text{[Expression 22]}$$

Note that, in the third example embodiment as well, the feature value calculation unit 20 may also normalize the surface displacement amount $\Delta x_r(t)$ and the deflection amount $\delta_r(t)$ of each of the regions of interest, similarly to the first and second example embodiments. In this case, the normalized surface displacement amount $\Delta x_r^N(t)$ and the normalized deflection amount $\delta_r^N(t)$ are used in the following Expression 22.

Also, in the third example embodiment, the spatial distribution calculation unit 30 calculates a dispersion of the first variable $k_1^r$ and the second variable $k_2^r$ between the regions of interest as a spatial distribution of feature values of the structure 200, using the first variable $k_1^r$ and the second variable $k_2^r$ calculated for each of the regions of interest.

Processing performed by the feature value calculation unit 20 will now be described in detail with reference to FIG. 14. FIG. 14 illustrates processing performed by the spatial distribution calculation unit according to the third example embodiment of the invention.

Specifically, the spatial distribution calculation unit 30 calculates an average $\mu_{k1}$ of the first variables $k_1^r$ of the respective regions of interest, and an average $\mu_{k2}$ of the second variables $k_2^r$ of the respective regions of interest, using the following Expression 23.

$$\mu_{k_1} = \frac{1}{N_r} \sum_r k_1^r; \mu_{k_2} = \frac{1}{N_r} \sum_r k_2^r \qquad \text{[Expression 23]}$$

Then, the spatial distribution calculation unit 30 applies the average $\mu_{k1}$ and the average $\mu_{k2}$ calculated using the above Expression 23 to the following Expression 24, and calculates a dispersion metric $\sigma_k$ of the first variables $k_1^r$ and the second variables $k_2^r$ between the regions of interest.

$$\sigma_k^2 = \sum_x (k_1^r - \mu_{k_2}) + (k_2^r + \mu_{k_1})^2 \qquad \text{[Expression 24]}$$

In the third example embodiment, the degradation state determination unit 40 determines the degradation state of the structure 200 based on the dispersion metric $\sigma_k$. For example, if the value of the dispersion metric 94 $_k$ is greater than or equal to a threshold, the degradation state determination unit 40 determines that the degradation level of the structure 200 is "high", and if the value of the dispersion metric $\sigma_k$ is smaller than the threshold, the degradation state determination unit 40 determines that the degradation level of the structure 200 is "low". Note that the degradation level is not limited to being one of two levels that are "high" and "low", and the value of the dispersion metric $\sigma_k$ may be used to indicate a continuous degradation level.

Next, operations of the state determination apparatus according to the third example embodiment will be described with reference to FIG. 15. FIG. 15 is a flowchart showing operations of the state determination apparatus according to the third example embodiment of the invention. The following description will reference FIGS. 1, 2, and 14 as appropriate. In the third example embodiment as well, the state determination method is carried out by operating the state determination apparatus. Accordingly, the following description of the operations of the state determination apparatus also replaces the description of the state determination method according to the third example embodiment.

Figure 15:
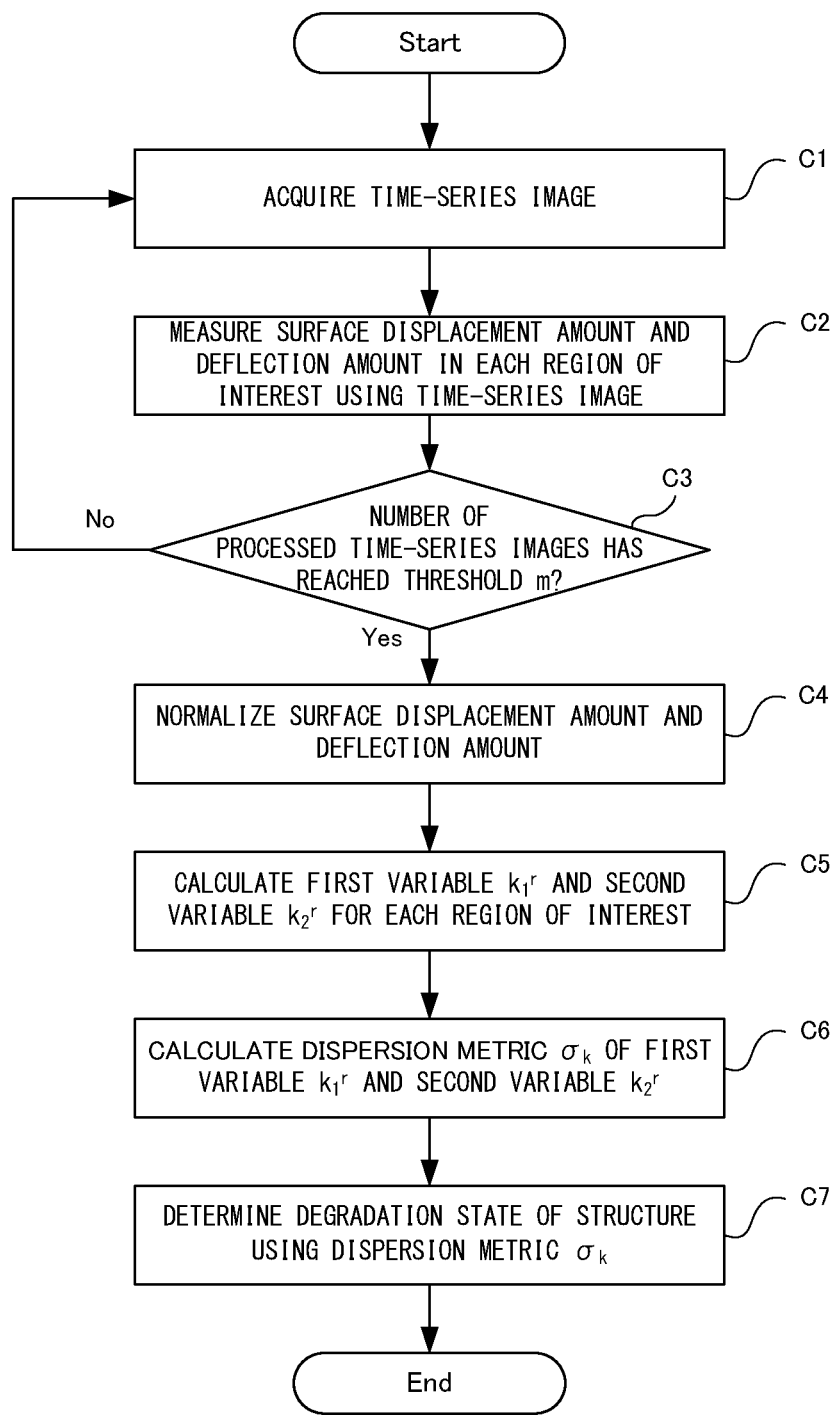
FIG. 15 is a flowchart showing operations of the state determination apparatus according to the third example embodiment of the invention.

As shown in FIG. 15, first, the measurement unit 10 acquires image data of a time-series image from the image capture device 50 (step C1). Step C1 is the same step as step A1 shown in FIG. 10.

Next, the measurement unit 10 calculates a deflection amount and a surface displacement amount of the structure 200 for each of the regions of interest, using the image data acquired in step C1 and the already-acquired image data of the reference image (step C2). Step C2 is the same step as step A2 shown in FIG. 10.

Next, the measurement unit 10 determines whether or not the number of process images that underwent the processing in step C2 has reached a threshold m (step C3). Step C3 is the same step as step A3 shown in FIG. 10. If, as a result of the determination in step C3, the number of process images has not reached the threshold m, the measurement unit 10 performs step C1 again to acquire a new process image, and performs step C2 again.

On the other hand, if, as a result of the determination in step C3, the number of process images has reached the threshold m, the measurement unit 10 delivers, to the feature value calculation unit 20, the measured deflection amount $\delta_r(t)$ and surface displacement amount $\Delta x_r(t)$ of each of the regions of interest. Thus, the feature value calculation unit 20 removes high-frequency components from the surface displacement amount $\Delta x_r(t)$ and the deflection amount $\delta_r(t)$, and performs normalization (step C4). Step C4 is the same step as step A4 shown in FIG. 10.

Next, the feature value calculation unit 20 calculates, as feature values, the first variable $k_1^r$ and the second variable $k_2^r$ for each of the regions of interest, as shown in FIG. 11 (step C5).

Next, the spatial distribution calculation unit 30 calculates a dispersion metric $\sigma_k$ between the regions of interest using the first variables $k_1^r$ and the second variables $k_2^r$ calculated in step C5. (step C6).

Next, the degradation state determination unit 40 determines the degradation state of the structure 200 based on the dispersion metric σk calculated in step C6 (step C7). The degradation state determination unit 40 also outputs the determination result to an external terminal device or the like.

[Effects of third example embodiment]

As described above, in the third example embodiment, the state determination apparatus calculates, for each of the regions of interest, the first variable $k_1^r$ and the second variable $k_2^r$ that indicate a relationship between a deflection amount and a surface displacement amount, and determines the degradation state of the structure based on the dispersion metric $\sigma_k$ of the calculated first variables $k_1^r$ and second variables $k_2^r$. That is to say, the smaller the distribution of the dispersion metric $\sigma_k$ between the regions of interest, the lower the degradation level (the soundness is higher). For this reason, the third example embodiment also clarifies the criteria for determining the degradation state, and can also cope with a change in the material of the structure, similarly to the first example embodiment. The third example embodiment can also make it possible to properly determine the degradation state of a structure, and can also enhance robustness of the determination.

[Program]

The program according to the third example embodiment need only be a program for causing a computer to perform steps C1 to C7 shown in FIG. 15. The state determination apparatus and the state determination method according to the third example embodiment can be realized by installing this program on a computer and executing the program. In this case, a CPU (Central Processing Unit) of the computer functions as the measurement unit 10, the feature value calculation unit 20, the spatial distribution calculation unit 30, and the degradation state determination unit 40, and performs processing.

The program according to the third example embodiment may also be executed by a computer system that includes by a plurality of computers. In this case, for example, each of the computers may function as any of the measurement unit 10, the feature value calculation unit 20, the spatial distribution calculation unit 30, and the degradation state determination unit 40.

(Specific Examples)

Specific examples of the first to third example embodiments will now be described with reference to FIG. 16. FIG. 16 shows an example of the results of determining the degradation state according to the first to third example embodiments of the invention. As shown in FIG. 16, in the first example embodiment, the degradation state determination unit 40 determines that the degradation level of a structure is low if the correlated change metric $e_r$ is smaller than "0.001", and determines that the degradation level of the structure is high if not.

In the second example embodiment, the degradation state determination unit 40 determines that the degradation level of the structure 200 is low if the value of the cumulative entropy metric $H_c$ is smaller than "0.75", and determines that the degradation level of the structure 200 is high if not.

In the third example embodiment, the degradation state determination unit 40 determines that the degradation level of the structure 200 is low if the value of the dispersion metric $\sigma_k$ is smaller than "0.01", and determines that the degradation level of the structure 200 is high if not. Note that the degradation level is not limited to being one of two levels that are "high" and "low", and the values of the correlated change metric $e_r$, the cumulative entropy metric $H_c$, and the dispersion metric $\sigma_k$ may be used to indicate a continuous degradation level.

As shown in FIG. 16, the results of determining the degradation state according to the example embodiments coincide with the results of determining degradation of the structure (bridge) 200 as per a visual check conducted by an inspector. Based on these results, according to the first to third example embodiments, determination results that are equal to those obtained when an inspector conducts an inspection can be obtained.

(Physical configuration)

Figure 17:
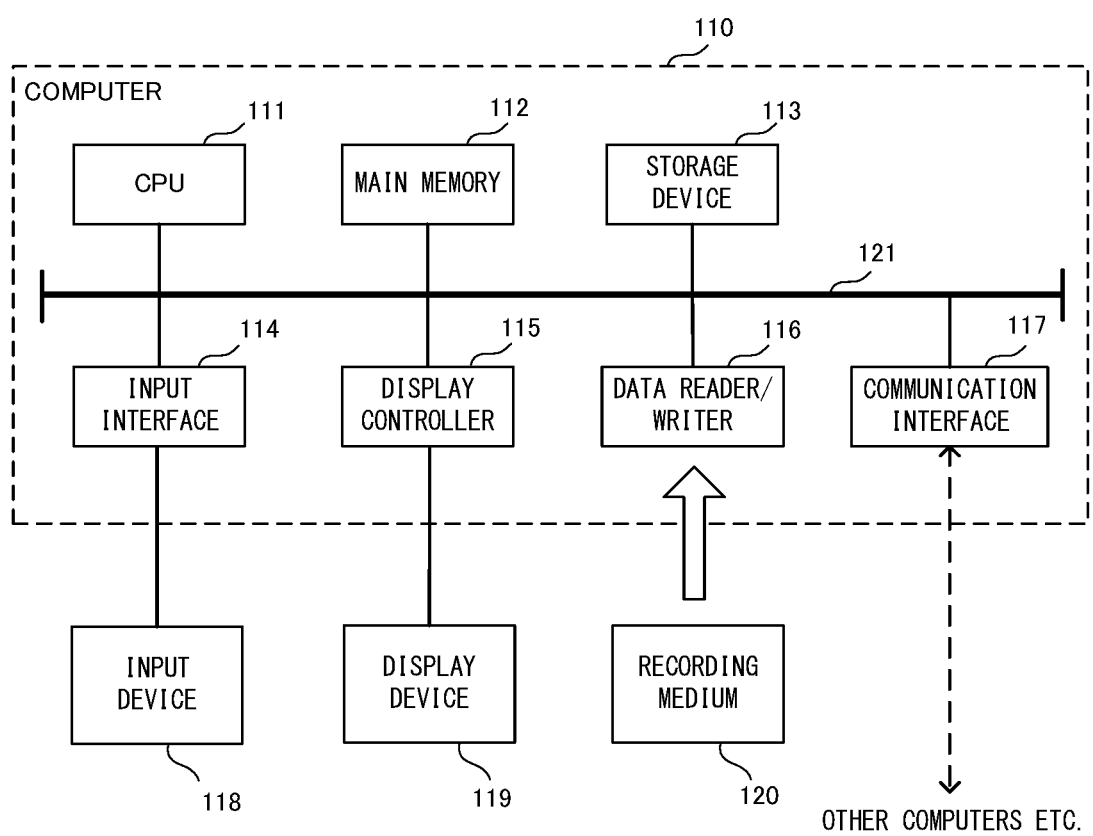
FIG. 17 is a block diagram showing an example of a computer that realizes the degradation state determination apparatus according to the first to third example embodiments of the invention.

A description will now be given, with reference to FIG. 17, of a computer that realizes the state determination apparatus by executing the program according to the first to third embodiments. FIG. 17 is a block diagram showing an example of a computer that realizes the state determination apparatus according to the first to third example embodiments of the invention.

As shown in FIG. 17, a computer 110 includes a CPU 111, a main memory 112, a storage device 113, an input interface 114, a display controller 115, a data reader/writer 116, and a communication interface 117. These units are connected to each other via a bus 121 so as to be able to communicate data.

The CPU 111 loads the program (codes) according to these embodiments that are stored in the storage device 113 to the main memory 112 and executes the codes in a predetermined order, thereby performing various kinds of computation. The main memory 112 is typically a volatile storage device such as a DRAM (Dynamic Random Access Memory). The program according to these example embodiments is provided in a state of being stored in a computer-readable recording medium 120. Note that the program according to these example embodiments may also be distributed on the Internet to which the computer is connected via the communication interface 117.

Specific examples of the storage device 113 may include a hard disk drive, a semiconductor storage device such as a flash memory, and the like. The input interface 114 mediates data transmission between the CPU 111 and input devices 118 such as a keyboard and a mouse. The display controller 115 is connected to a display device 119 and controls a display on the display device 119.

The data reader/writer 116 mediates data transmission between the CPU 111 and the recording medium 120, reads out the program from the recording medium 120, and writes, in the recording medium 120, the results of processing performed by the computer 110. The communication interface 117 mediates data transmission between the CPU 111 and other computers.

Specific examples of the recording medium 120 may include a general-purpose semiconductor storage device such as a CF (Compact Flash (registered trademark)) or an SD (Secure Digital), a magnetic recording medium such as a Flexible Disk, and an optical recording medium such as a CD-ROM (Compact Disk Read Only Memory).

The state determination apparatus according to these example embodiments may also be realized using hardware that corresponds to each of the units, rather than a computer in which the program is installed. Furthermore, the state determination apparatus may be partially realized by a program, and the remainder may be realized by hardware.

Part of, or the entire embodiment described above can be expressed by the following (Supplementary note 1) to (Supplementary note 18), but is not limited thereto.

(Supplementary Note 1)

A state determination apparatus for determining a state of a structure, including:
  a measurement unit configured to measure a deflection amount and a surface displacement amount of the structure in each of a plurality of target regions that are preset on the structure;
  a feature value calculation unit configured to calculate, for the plurality of respective target regions, feature values each indicating a relationship between the deflection amount and the surface displacement amount, using the measured deflection amount and surface displacement amount;
  a spatial distribution calculation unit configured to calculate a spatial distribution of the feature values of the structure, using the feature values calculated for the plurality of respective target regions; and
  a degradation state determination unit configured to determine a degradation state of the structure based on the calculated spatial distribution of the feature values of the structure.

(Supplementary Note 2)

The state determination apparatus according to supplementary note 1,
  wherein the feature value calculation unit obtains, as the feature values, correlation functions each indicating a relationship between the deflection amount and the surface displacement amount, for the plurality of respective target regions, and
  the spatial distribution calculation unit calculates the spatial distribution of the feature values of the structure using the correlation functions obtained for the plurality of respective target regions.

(Supplementary Note 3)

The state determination apparatus according to supplementary note 2,
  wherein the spatial distribution calculation unit calculates a dispersion of a distribution function obtained based on the correlation function group for the target regions as the spatial distribution of the feature values of the structure, using the correlation functions obtained for the plurality of respective target regions.

(Supplementary Note 4)

The state determination apparatus according to supplementary note 2,
  wherein the spatial distribution calculation unit calculates an entropy distribution of a distribution function obtained based on the correlation function group for the target regions as the spatial distribution of the feature values of the structure, using the correlation functions obtained for the plurality of respective target regions.

(Supplementary Note 5)

The state determination apparatus according to supplementary note 1,
  wherein the feature value calculation unit calculates, as the feature values, a first variable and a second variable for each of the plurality of target regions, using a function that defines a relationship between the deflection amount, the surface displacement amount, and a time derivative of the deflection amount using the first variable and the second variable, and
  the spatial distribution calculation unit calculates a dispersion of the first variable and the second variable between the target regions as the spatial distribution of the feature value of the structure, using the first variable and the second variable calculated for each of the plurality of target regions.

(Supplementary Note 6)

The state determination apparatus according to any one of supplementary notes 1 to 5,
  wherein the measurement unit measures the deflection amount and the surface displacement amount of the structure, using data that is optically obtained from the structure.

(Supplementary Note 7)

A state determination method for determining a state of a structure, including:
  (a) a step of measuring a deflection amount and a surface displacement amount of the structure in each of a plurality of target regions that are preset on the structure;
  (b) a step of calculating, for the plurality of respective target regions, feature values each indicating a relationship between the deflection amount and the surface displacement amount, using the measured deflection amount and surface displacement amount;
  (c) a step of calculating a spatial distribution of the feature values of the structure, using the feature values calculated for the plurality of respective target regions; and
  (d) a step of determining a degradation state of the structure based on the calculated spatial distribution of the feature values of the structure.

(Supplementary Note 8)

The state determination method according to supplementary note 7,
  wherein, in the (b) step, correlation functions each indicating a relationship between the deflection amount and the surface displacement amount are obtained as the feature values for the plurality of respective target regions, and
  in the (c) step, the spatial distribution of the feature values of the structure is calculated using the correlation functions obtained for the plurality of respective target regions.

(Supplementary Note 9)

The state determination method according to supplementary note 8,
  wherein, in the (c) step, a dispersion of a distribution function obtained based on the correlation function group for the target regions is calculated as the spatial distribution of the feature values of the structure, using the correlation functions obtained for the plurality of respective target regions.

(Supplementary Note 10)

The state determination method according to supplementary note 8,
wherein, in the (c) step, an entropy distribution of a distribution function obtained based on the correlation function group for the target regions is calculated as the spatial distribution of the feature values of the structure, using the correlation functions obtained for the plurality of respective target regions.

(Supplementary Note 11)

The state determination method according to supplementary note 7,
wherein, in the (b) step, a first variable and a second variable are calculated for each of the plurality of target regions, as the feature values, using a function that defines a relationship between the deflection amount, the surface displacement amount, and a time derivative of the deflection amount using the first variable and the second variable, and
in the (c) step, a dispersion of the first variable and the second variable between the target regions is calculated as the spatial distribution of the feature values of the structure, using the first variable and the second variable calculated for each of the plurality of target regions.

(Supplementary Note 12)

The state determination method according to any one of supplementary notes 7 to 11,
wherein, in the (a) step, the deflection amount and the surface displacement amount of the structure are measured using data that is optically obtained from the structure.

(Supplementary Note 13)

A computer-readable recording medium that includes a program recorded thereon, the program being for determining a state of a structure using a computer,
the program including instructions that cause the computer to perform:
(a) a step of measuring a deflection amount and a surface displacement amount of the structure in each of a plurality of target regions that are preset on the structure;
(b) a step of calculating, for the plurality of respective target regions, feature values each indicating a relationship between the deflection amount and the surface displacement amount, using the measured deflection amount and surface displacement amount;
(c) a step of calculating a spatial distribution of the feature values of the structure, using the feature values calculated for the plurality of respective target regions; and
(d) a step of determining a degradation state of the structure based on the calculated spatial distribution of the feature values of the structure.

(Supplementary Note 14)

The computer-readable recording medium according to supplementary note 13,
wherein, in the (b) step, correlation functions each indicating a relationship between the deflection amount and the surface displacement amount are obtained as the feature values for the plurality of respective target regions, and
in the (c) step, the spatial distribution of the feature values of the structure is calculated using the correlation functions obtained for the plurality of respective target regions.

(Supplementary Note 15)

The computer-readable recording medium according to supplementary note 14,
wherein, in the (c) step, a dispersion of a distribution function obtained based on the correlation function group for the target regions is calculated as the spatial distribution of the feature values of the structure, using the correlation functions obtained for the plurality of respective target regions.

(Supplementary Note 16)

The computer-readable recording medium according to supplementary note 14,
wherein, in the (c) step, an entropy distribution of a distribution function obtained based on the correlation function group for the target regions is calculated as the spatial distribution of the feature values of the structure, using the correlation functions obtained for the plurality of respective target regions.

(Supplementary Note 17)

The computer-readable recording medium according to supplementary note 13,
wherein, in the (b) step, a first variable and a second variable are calculated for each of the plurality of target regions, as the feature values, using a function that defines a relationship between the deflection amount, the surface displacement amount, and a time derivative of the deflection amount using the first variable and the second variable, and
in the (c) step, a dispersion of the first variable and the second variable between the target regions is calculated as the spatial distribution of the feature values of the structure, using the first variable and the second variable calculated for each of the plurality of target regions.

(Supplementary Note 18)

The computer-readable recording medium according to any one of supplementary notes 13 to 17,
wherein, in the (a) step, the deflection amount and the surface displacement amount of the structure are measured using data that is optically obtained from the structure.

The invention of the present application has been described above with reference to the example embodiments, but the invention of the present application is not limited to the above example embodiments. The configurations and the details of the invention of the present application may be changed in various manners that can be understood by a person skilled in the art within the scope of the invention of the present application.

INDUSTRIAL APPLICABILITY

As described above, according to the invention, the degradation state of a structure can be properly determined using both a deflection amount and a surface distortion of the structure. The invention is available in determination of degradation of an infrastructural structure.

LIST OF REFERENCE SIGNS

10 Measurement unit
20 Feature value calculation unit
30 Spatial distribution calculation unit 40 Degradation state determination unit
50 Image capture device
100 State determination apparatus
110 Computer
111 CPU
112 Main memory
113 Storage device
114 Input interface
115 Display controller
116 Data reader/writer
117 Communication interface
118 Input device
119 Display device
120 Recording medium
121 Bus
200 Structure

The invention claimed is:

1. A state determination apparatus for determining a state of a structure, comprising:
   a measurement unit configured to measure a deflection amount and a surface displacement amount of the structure in each of a plurality of target regions that are preset on the structure;
   a feature value calculation unit configured to calculate, for the plurality of respective target regions, feature values each indicating a relationship between the deflection amount and the surface displacement amount, using the measured deflection amount and surface displacement amount;
   a spatial distribution calculation unit configured to calculate a spatial distribution of the feature values of the structure, using the feature values calculated for the plurality of respective target regions; and
   a degradation state determination unit configured to determine a degradation state of the structure based on the calculated spatial distribution of the feature values of the structure,
   wherein the feature value calculation unit obtains, as the feature values, correlation functions each indicating a relationship between the deflection amount and the surface displacement amount, for the plurality of respective target regions, and
   the spatial distribution calculation unit calculates the spatial distribution of the feature values of the structure using the correlation functions obtained for the plurality of respective target regions.

2. The state determination apparatus according to claim 1, wherein the spatial distribution calculation unit calculates a dispersion of a distribution function obtained based on the correlation functions for the target regions as the spatial distribution of the feature values of the structure, using the correlation functions obtained for the plurality of respective target regions.

3. The state determination apparatus according to claim 1, wherein the spatial distribution calculation unit calculates an entropy distribution of a distribution function obtained based on the correlation functions for the target regions as the spatial distribution of the feature values of the structure, using the correlation functions obtained for the plurality of respective target regions.

4. The state determination apparatus according to claim 1, wherein the feature value calculation unit calculates, as the feature values, a first variable and a second variable for each of the plurality of target regions, using a function that defines a relationship between the deflection amount, the surface displacement amount, and a time derivative of the deflection amount using the first variable and the second variable, and
   the spatial distribution calculation unit calculates a dispersion of the first variable and the second variable between the target regions as the spatial distribution of the feature value of the structure, using the first variable and the second variable calculated for each of the plurality of target regions.

5. The state determination apparatus according to claim 1, wherein the measurement unit measures the deflection amount and the surface displacement amount of the structure, using data that is optically obtained from the structure.

6. A state determination method for determining a state of a structure, comprising:
   a measuring a deflection amount and a surface displacement amount of the structure in each of a plurality of target regions that are preset on the structure;
   a calculating, for the plurality of respective target regions, feature values each indicating a relationship between the deflection amount and the surface displacement amount, using the measured deflection amount and surface displacement amount;
   a calculating a spatial distribution of the feature values of the structure, using the feature values calculated for the plurality of respective target regions; and
   a determining a degradation state of the structure based on the calculated spatial distribution of the feature values of the structure,
   wherein, in the calculating feature values, correlation functions each indicating a relationship between the deflection amount and the surface displacement amount are obtained as the feature values for the plurality of respective target regions, and
   in the calculating a spatial distribution, the spatial distribution of the feature values of the structure is calculated using the correlation functions obtained for the plurality of respective target regions.

7. The state determination method according to claim 6, wherein, in the calculating a spatial distribution, a dispersion of a distribution function obtained based on the correlation functions for the target regions is calculated as the spatial distribution of the feature values of the structure, using the correlation functions obtained for the plurality of respective target regions.

8. The state determination method according to claim 6, wherein, in the calculating a spatial distribution, an entropy distribution of a distribution function obtained based on the correlation functions for the target regions is calculated as the spatial distribution of the feature values of the structure, using the correlation functions obtained for the plurality of respective target regions.

9. The state determination method according to claim 6, wherein, in the calculating feature values, a first variable and a second variable are calculated for each of the plurality of target regions, as the feature values, using a function that defines a relationship between the deflection amount, the surface displacement amount, and a time derivative of the deflection amount using the first variable and the second variable, and
   in the calculating a spatial distribution, a dispersion of the first variable and the second variable between the target regions is calculated as the spatial distribution of the feature values of the structure, using the first variable and the second variable calculated for each of the plurality of target regions.

10. The state determination method according to claim 6, wherein, in the measuring, the deflection amount and the surface displacement amount of the structure are measured using data that is optically obtained from the structure.

11. A non-transitory computer-readable recording medium that includes a program recorded thereon, the program being for determining a state of a structure using a computer,
the program including instructions that cause the computer to perform:
a measuring a deflection amount and a surface displacement amount of the structure in each of a plurality of target regions that are preset on the structure;
a calculating, for the plurality of respective target regions, feature values each indicating a relationship between the deflection amount and the surface displacement amount, using the measured deflection amount and surface displacement amount;
a calculating a spatial distribution of the feature values of the structure, using the feature values calculated for the plurality of respective target regions; and
a determining a degradation state of the structure based on the calculated spatial distribution of the feature values of the structure,
wherein, in the calculating feature values, correlation functions each indicating a relationship between the deflection amount and the surface displacement amount are obtained as the feature values for the plurality of respective target regions, and
in the calculating a spatial distribution, the spatial distribution of the feature values of the structure is calculated using the correlation functions obtained for the plurality of respective target regions.

12. The non-transitory computer-readable recording medium according to claim 11,
wherein, in the calculating a spatial distribution, a dispersion of a distribution function obtained based on the correlation functions for the target regions is calculated as the spatial distribution of the feature values of the structure, using the correlation functions obtained for the plurality of respective target regions.

13. The non-transitory computer-readable recording medium according to claim 11,
wherein, in the calculating a spatial distribution, an entropy distribution of a distribution function obtained based on the correlation functions for the target regions is calculated as the spatial distribution of the feature values of the structure, using the correlation functions obtained for the plurality of respective target regions.

14. The non-transitory computer-readable recording medium according to claim 11,
wherein, in the calculating feature values, a first variable and a second variable are calculated for each of the plurality of target regions, as the feature values, using a function that defines a relationship between the deflection amount, the surface displacement amount, and a time derivative of the deflection amount using the first variable and the second variable, and
in the calculating a spatial distribution, a dispersion of the first variable and the second variable between the target regions is calculated as the spatial distribution of the feature values of the structure, using the first variable and the second variable calculated for each of the plurality of target regions.

15. The non-transitory computer-readable recording medium according to claim 11,
wherein, in the measuring, the deflection amount and the surface displacement amount of the structure are measured using data that is optically obtained from the structure.

* * * * *